(12) United States Patent
Yankov et al.

(10) Patent No.: US 8,585,268 B2
(45) Date of Patent: Nov. 19, 2013

(54) LIGHT-GUIDE PANEL FOR DISPLAY WITH LASER BACKLIGHT

(75) Inventors: Vladmir Yankov, Washington Township, NJ (US); Alexander Goltsov, Troitsk (RU); Igor Ivonin, Yubileinyi (RU); Konstantin Kravtsov, Moscow (RU); Leonid Velikov, San Carlos, CA (US)

(73) Assignee: Ergophos, LLC, San Carlos, CA (US)

( * ) Notice: Subject to any disclaimer, the term of this patent is extended or adjusted under 35 U.S.C. 154(b) by 227 days.

(21) Appl. No.: 13/317,544

(22) Filed: Oct. 21, 2011

(65) Prior Publication Data

US 2013/0100695 A1 Apr. 25, 2013

(51) Int. Cl.
*A47F 3/00* (2006.01)
*F21V 7/04* (2006.01)
*G02F 1/1335* (2006.01)
*H03H 9/00* (2006.01)

(52) U.S. Cl.
USPC ............ 362/561; 362/259; 362/610; 362/616

(58) Field of Classification Search
USPC ................ 362/259, 553, 561, 608, 610, 616; 349/62–63, 65–66, 69
See application file for complete search history.

(56) References Cited

U.S. PATENT DOCUMENTS

| | | | |
|---|---|---|---|
| 7,508,466 B2 | 3/2009 | Hutchins | |
| 7,841,730 B2 | 11/2010 | Hara et al. | |
| 7,845,841 B2 | 12/2010 | Sampsell | |
| 7,969,532 B2 | 6/2011 | Mizushima et al. | |
| 8,009,243 B2 | 8/2011 | Chen et al. | |
| 2008/0259247 A1 | 10/2008 | Stuart et al. | |
| 2011/0026270 A1 | 2/2011 | Onishi | |
| 2011/0194307 A1 | 8/2011 | Chen et al. | |
| 2011/0199559 A1 | 8/2011 | Nakamura | |
| 2011/0199670 A1 | 8/2011 | Chen et al. | |
| 2011/0199786 A1 | 8/2011 | Tatsuo et al. | |
| 2011/0205453 A1 | 8/2011 | Kasai | |
| 2011/0205756 A1 | 8/2011 | Kim et al. | |
| 2011/0211368 A1 | 9/2011 | Mishima | |

*Primary Examiner* — Jason Moon Han

(57) ABSTRACT

The invention relates to a light-guide panel for an LCD with a laser backlight. The panel comprises a laser light source and a main ridge waveguide with a plurality of first holograms that change the direction of the laser light that propagates along the main ridge waveguide to the direction perpendicular to the latter. The first holograms are associated with thee light of predetermined wavelengths and are optically connected to respective transverse waveguides that lie in the same plane but are perpendicular to the main ridge waveguide. Each transverse ridge waveguide has a plurality of second holograms designed so that they change the direction of laser light that propagates along the transverse ridge waveguide in the direction at an angle to the plane of the LGP substrate. This angle should be close to 90° and may be obtained in the range of 70° to 85°.

21 Claims, 18 Drawing Sheets

LIGHT-GUIDE PANEL FOR DISPLAY WITH LASER BACKLIGHT

FIELD OF THE INVENTION

The present invention relates to a light-guide panel (LGP) for a liquid-crystal display (LCD), in particular to a backlight module of an LCD with backlight used to deliver laser light to such a display. The invention may find application in the backlight modules of LCD panels used in mobile phones, touch pads, laptops, TV sets, etc.

BACKGROUND OF THE INVENTION

A liquid crystal display (LCD) is a well known device that uses the light-modulating properties of liquid crystals since liquid crystals, themselves, do not emit light. Nowadays, LCDs occupy a large niche and are used in a wide range of applications, including computer monitors, televisions, instrument panels, video players, gaming devices, clocks, telephones, etc. LCDs have gradually replaced cathode ray tubes (CRTs) and projection-type displays since they generally have a relatively thin sandwiched structure and therefore are more compact, lightweight, portable, less expensive, more reliable, and easier on the eyes. In addition, LCDs are more energy efficient and safer to use, and they can operate in a higher brightness mode than CRTs.

Typically, an LCD comprises an electronically modulated optical device sandwiched from a number of segments filled with liquid crystals and arrayed in front of a light source, which is known as a backlight, or reflector, to produce images in color or monochrome. The most flexible LCDs use an array of small pixels.

A backlight module is one of the main components of any LCD and is the source of illumination used in LCDs. LCDs do not produce light, themselves, and in order to produce an image, they need illumination. This function is accomplished by the backlight module, which illuminates the LCD from the side or back of the display panel.

Typically, a backlight module consists of a lamp and a light-guide panel (LGP). The external light source applied to the backlight module can be properly selected, depending on the size and use of the LCD. The external light source may be a point light source such as a light bulb and a white halogen lamp, a line light source (e.g., a hot cathode or cold cathode fluorescent lamp), or a surface light source (e.g., a light-emitting diode [LED]) formed in an electroluminescent (EL) matrix form.

The LGP, itself, is also an important element of the LCD. An LGP comprises a thin and sandwiched structure, the purpose of which is to provide uniform distribution of light emitted from the backlight lamp under the display structure. An LGP should possess a number of specific properties: the delivery of maximum amount of light from the lamp to the display assembly and the provision of uniform intensity of light over the entire surface of the display. The latter property is important, and hundreds of patents and published patent applications are dedicated to accomplishing this task.

More specifically, some patent publications describe uniformity of backlight illumination achieved by deviation of the LGP from a plane-parallel structure (see, e.g., U.S. Pat. No. 7,845,841 and US Published Patent Application No. 2011/0199786); some patent publications describe uniformity of backlight illumination achieved by modifying methods used for introduction of light into the LGP, e.g., through profiled edges on the panel side (see, e.g., US Patent Application Publication No. 2011/0211368); other publications describe the use of deflectors for diffusion scattering and redistribution of light (see U.S. Pat. Nos. 7,841,730; 8,009,243; and 7,969,532; and US Patent Application Publications Nos. 2011/0205756 and 2011/0199670); and some publications describe uniformity of backlight illumination achieved by dividing the surface of the LGP into separate sections and delivering light to all of these sections so as to provide uniform light intensity in all sections irrespective of local positions and distances from the source of light (see, e.g., US Patent Application Publications Nos. 2011/0194307; 2011/0199559; and 2011/0205453).

The use of lasers for backlighting is known. For example, U.S. Pat. No. 7,508,466 discloses an LCD that includes a planar array of transmissive LCD devices and at least one laser diode device spaced apart from the planar array of LCD devices. At least one laser diode device is configured to illuminate at least one subset of LCD devices in the planar array of LCD devices, so that in operation the laser diode device provides backlighting for the subset of LCD devices.

US Patent Application Publication No. 20110026270 discloses a surface light-source device from which large planar light with uniform light intensity distribution can be obtained from spot-like laser light. The surface light-source device comprises a laser light source for emitting the laser light, an optical system including one or more reflective diffusion members, and an optical waveguide combined with the optical system for converting reflected and diffused laser light into planar light and emitting from a principal plane. The reflective diffusion member converts the laser light emitted from the laser light source into linear light having an arcuate radiation pattern.

US Patent Application Publication No. 20080259247 discloses displays such as LCD panels that are illuminated with frequency-doubled vertically extended cavity surface emitting lasers (VECSELs) as efficient light sources. Visible light from VECSELs are directed to an illuminating panel using optical fibers and/or optical gratings to provide substantially uniform illumination of the illuminating panel. Visible light from the illuminating panel, which can be provided at a particular number of primary wavelengths by the VECSELs, is then used to illuminate the display.

A disadvantage of all LGP devices known to the inventors, including those based on the use of lasers, is their relatively complicated design and low efficiency of illumination.

SUMMARY OF THE INVENTION

The present invention relates to a light-guide panel (LGP) for an LCD, in particular to a backlight module of an LCD with backlight used to deliver laser light to such a display. The LGP comprises a flat plate that contains on its surface a net of planar ridge waveguides. This net is used for delivering specific monochromatic laser lights, e.g., of red, green, and blue colors to specific points of the LGP. The pattern of the aforementioned specific points of the LGP coincides with the pattern of LCD pixels. By means of holograms of the invention that are formed with a predetermined periodicity on the surfaces of the waveguides the lights are emitted outward from the aforementioned points in the direction close to perpendicular to the LGP plane.

On the surface of the LGP, the holograms form a rectangular matrix. An elementary cell of this matrix consists of holograms of three types, each type emitting a light of a predetermined color, i.e., of a predetermined wavelengths. For example, each cell contains holograms that emit lights of red, green, and blue color, respectively. The lateral topology of the waveguide network, and hence, the dimension of the LGP, may vary in a wide range. On the other hand, the content and dimensions of each unit cell also may vary, depending on the requirements. For example, the cell may incorporate more than three colors or may have dimensions that can be selected in the range of about 10 $\mu m^2$ to about several square millimeters.

An important feature of the LGP of the invention is high uniformity of illumination over the entire LGP surface unattainable with conventional LGPs. This is achieved by purposefully changing the hologram parameters, e.g., by rarifying the holographic elements that constitute the hologram. What is meant herein under the term "rarifying" is changing the density of the elements in the hologram and thus adjusting the light efficiency of the hologram.

Another remarkable feature of the LGP of the invention is its extraordinary high light efficiency that exceeds the light efficiency of the conventional LGPs at least with a factor of three when the LGP is used in an LCD. This is because matrices of light filters used in conventional LCDs decompose the white light received from the respective conventional LGP into respective monochromatic lights, e.g., into RGB, and in this case emission, e.g., of the green light in the respective cell of the light filter is accompanied by absorption of the red and blue light components. The same is true for lights of other colors. In other words, in the illustrated case, two-third of the light energy is lost.

However, as has been mentioned above, in the LGP of the invention a light component of each color is delivered to each pixel directly without the use of a filter that becomes unnecessary.

The invention may find application in the backlight modules of LCD panels used in mobile phones, touch pads, laptops, TV sets, etc. The proposed LGP has a layered structure that comprises a substrate, a lower cladding on the substrate, a core, and that may contain an upper cladding. Furthermore, the LGP contains a laser light source arranged along one or several sides of the panel.

Arranged along the light-source side of the panel is a main ridge waveguide that has a strip-like form. The main ridge waveguide contains a plurality of first holograms that are formed in the upper part of the thickness of the core and that are arranged in sequence along the main ridge waveguide. These first holograms are formed on the core of the main ridge waveguide and have a design that changes the direction of the laser light propagating along the main ridge waveguide to the direction that is perpendicular to the main ridge waveguide.

The first holograms are divided into a plurality of types. The holograms of each type interact with a light of a predetermined wavelength and ignore the lights of other wavelengths. Furthermore, the first holograms of different types are organized into identical groups, and these identical groups are arranged in sequence along the main ridge waveguide.

The LGP also comprises a plurality of transverse ridge waveguides that are spaced from each other, are formed in the upper part of the thickness of the core, extend perpendicular to the light-source side of the light-guiding panel, and are optically coupled with the first holograms of a predetermined type.

Each transverse ridge waveguide comprises a plurality of second holograms that are arranged in sequence and interact with the light of the wavelength of the first holograms to which they are optically coupled. The second holograms have a design that changes the direction of laser light that propagates along the respective transverse ridge waveguides in the direction at an angle perpendicular to the plane of the transverse ridge waveguides. Preferably, this angle should be close to 90° and in reality may be, e.g., in the range of 70 to 85°.

The first holograms and the second holograms are composed of holographic elements: grooves and teeth between the grooves, and in each group of holograms the holographic elements of each type are arranged with predetermined pitches. According to the invention, the first holograms are composed of holographic elements of 45° gratings. Each identical group of the first holograms comprises holograms of at least three types that interact with wavelengths of red light, green light, and blue light, respectively.

According to one or several aspects of the invention, the teeth of the holograms comprise a continuous line of discrete linear or curvilinear sections separated from each other. An example of a curvilinear holographic element is the element that in a plan view has a hyperbolic shape. The pitch with which the discrete holograms are arranged may vary.

DETAILED DESCRIPTION OF THE INVENTION

The present invention relates to a specific LGP module that allows delivery of laser light with three or more different wavelengths (e.g., wavelengths of light corresponding to red, green, and blue colors) to the back side of an LCD so that the light is delivered to the surface areas of the LGP in a pattern that coincides with the pattern of pixels on the LCD.

Use of pixilated laser backlighting in accordance with the principle of the invention allows to significantly simplify the design of a traditional display. Since the backlighting is performed with use of red, green, and blue lasers, the matrix of color filters becomes unnecessary. After all LPG conversion and division into a plurality of sub-beams, the red, green, and blue radiation remains polarized, and this polarization is preserved in the LPG plane. For this reason, one of polarizers of the display also can be eliminated.

In liquid crystal displays, pixelation is defined by an active (electronically controllable) matrix that is formed on the surface of one of the thin glass plates (TFT [thin-film transistor] glass). This plate together with another similar glass plate has a sandwich-like structure, with liquid crystal filled between these glass plates. TFT glass has as many thin film transistors as the number of subpixels displayed, while a color-filter glass has a color filter that generates color. Liquid crystal molecules rearrange according to the difference in voltage between the color-filter glass and the TFT glass. The amount of light supplied by the backlight unit is determined by the amount of reordering of the liquid crystal molecules in such a way as to generate color. The structure of such a matrix is beyond the scope of the present invention; however, to better understand the invention it worth mentioning that, in general, active-matrix LCD technology uses for control vertical and horizontal electrical interconnections addressable to corresponding TFTs (sub-pixels) that render images on the screen.

Each pixel location (one LCD cell) has at least three separate sub-pixels in red, green, and blue that allow the image to be rendered in full color. The light-guide panel of the invention used for a display with laser backlight makes it possible to deliver light simultaneously to all such sub-pixels.

Figure 1:
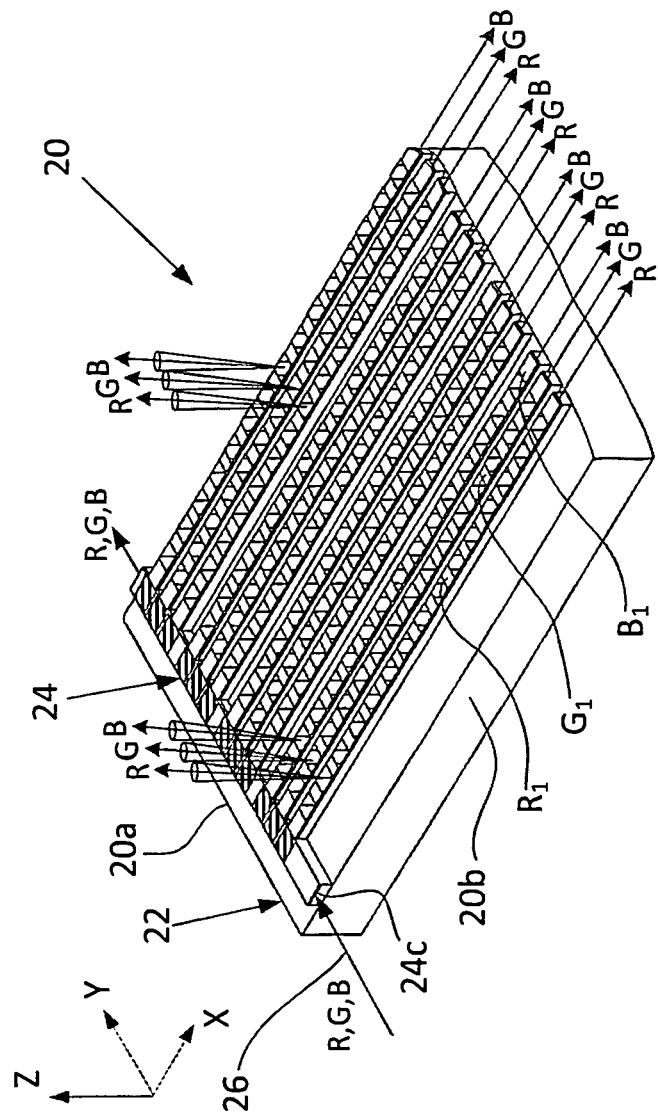
FIG. 1 is a three-dimensional view of a part of the LGP of the invention.
Figure 2:
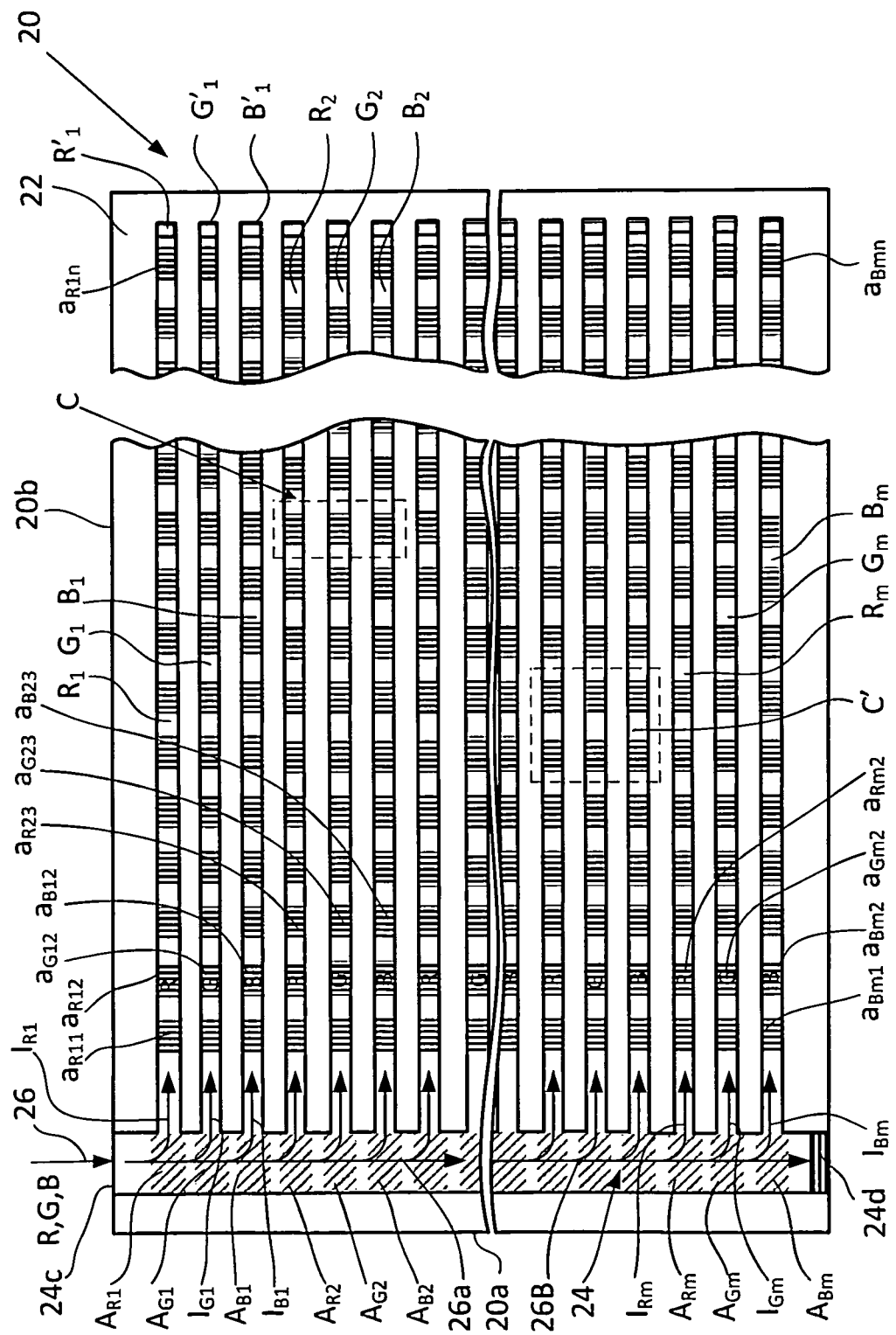
FIG. 2 is a top view of the LGP in FIG. 1.

The LGP of the invention for display with a laser backlight, which is designated by reference numeral 20, is shown in FIGS. 1 and 2, where FIG. 1 is a three-dimensional view of a part of the LGP 20 and FIG. 2 is a top view of the entire LGP 20 with a portion removed for simplification of the drawings. As seen in FIG. 1, the LGP 20 has a sandwiched structure that consists of components that are described below.

The support element of the LGP 20 is a substrate 22, which may comprise a thin transparent plate made of glass or polymer, e.g., polymethylmethacrylate, or its copolymers. The substrate 22 may have a thickness in the range of 0.5 to 1.5 mm. The shape of the substrate 20 corresponds to the shape of the LCD (not shown), with a long side 20a that extends in the longitudinal direction and a short side 20b that extends in the transverse direction (in FIG. 2 the longer side 20a looks shorter than the shorter side 20b because a part of the LGP is removed for the convenience of the drawing). The geometry of the substrate is optional and depends on the shape of the LCD screen and therefore is shown in FIG. 2 only as an example.

Formed on the surface of the substrate 20, more specifically, near the edge of the long side 20a, is a main ridge waveguide 24 that comprises a strip-like waveguide arranged parallel to the edge of the long side 20a (FIG. 2) and is intended for launching and guiding red, green, and blue (RGB) lights (shown by arrow 26 in FIG. 2) radiated from RGB lasers (not shown) in the longitudinal direction of the main ridge waveguide 24. This radiation propagates in the ridge waveguide 24 in the form of a quasi-single mode, a single mode, or consists of several close modes.

Figure 3A:
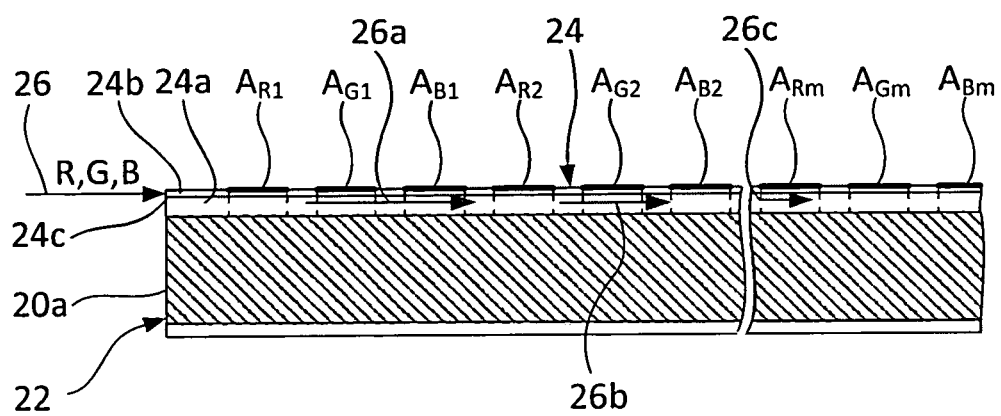
FIG. 3A is a fragment of a longitudinal cross-section through the center of the main ridge waveguide in a direction perpendicular to the surface of the substrate.

As shown in FIG. 3A, which is a fragment of a longitudinal cross-section through the center of the main ridge waveguide 24, e.g., perpendicular to the surface of the substrate 20, this waveguide consists of a lower cladding 24a having a thickness in the range of 3 to 20 µm, preferably 4 to 8 µm, and a core 24b that has a thickness of 0.75 to 2.5 µm and that has in it upper part (having a thickness of several tens of nanometers) a plurality of first holograms $A_{R1}$, $A_{G1}$, $A_{B1}$, $A_{R2}$, $A_{G2}$, $A_{B2}$, ... $A_{Rm}$, $A_{Gm}$, $A_{Bm}$ (shown in FIGS. 2 and 3A). These first holograms are arranged in sequence on the main ridge waveguide 24 and are spaced from each other at certain distances. Furthermore, depending on the wavelength of light with which they interact, these first holograms are divided into three types. For example, the first holograms $A_{R1}$, $A_{R2}$, ... $A_{Rm}$ form the holograms of the first type, which interact only with red light and which ignore the light components of other wavelengths that propagate along the main ridge waveguide 24 in the direction of arrows 26a and 26b (FIG. 2). Holograms $A_{G1}$, $A_{G2}$, ... $A_{Gm}$ form the first holograms of the second type, which interact only with green light and which ignore the light components of other wavelengths that propagate along the main ridge waveguide 24 in the direction of arrows 26a and 26b (FIG. 2). Holograms $A_{B1}$, $A_{B2}$, ... $A_{Bm}$ form first holograms of the third type that interact only with blue light and ignore the light components of other wavelengths that propagate along the main ridge waveguide 24 in the direction of arrows 26a and 26b (FIG. 2). It is understood that holograms of each type interact with the light of the predetermined wavelength and are contained in amount "m". Thus, we have holographic elements of three types, which differ by color of transmitted light.

In accordance with one or several aspects of the invention, three holograms of different colors are arranged in sequence and form triplets. More specifically, holograms $A_{R1}$, $A_{G1}$, $A_{B1}$ form the first triplet T1 (see FIG. 3C below), which interacts with lights of three different colors, i.e., red light, green light, and blue light. It is understood that the main ridge waveguide 24 contains in total "m" such triplet groups, e.g., the last triplet can be designated Tm.

It is also understood that a combination of consecutive holograms into triplets is given only as an example and that the holograms of colors other than red, green, and blue also can be added. For example, consecutive elements may also contain yellow components and may be combined into sets of four.

Figure 3B:
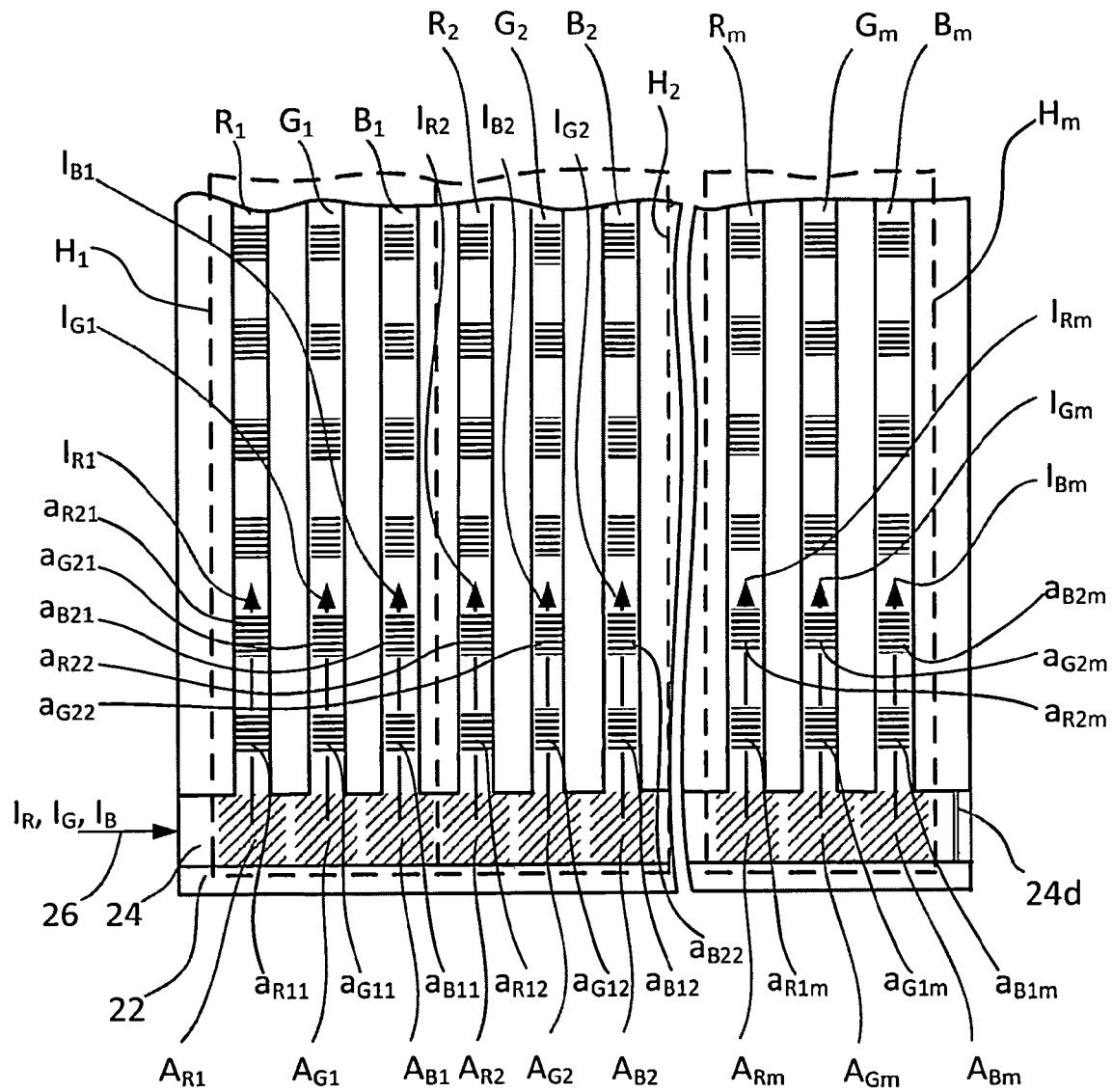
FIG. 3B is a fragmental top view of the LGP of the invention that illustrates organization of the first holograms of different types in triplets.

The aforementioned holograms $A_{R1}, A_{G1}, A_{B1} \ldots A_{Rm}, A_{Gm}, A_{Bm}$ are designed so that they receive light in accordance with the wavelength assigned to them and reorient the direction of light propagation perpendicular to the direction of the arrows 26a and 26b, i.e., in the direction of arrows $I_{R1}, I_{G1}, I_{B1}, \ldots I_{Rm}, I_{Gm}, I_{Bm}$ (FIGS. 2 and 3B).

Attached to holograms $A_{R1}, A_{G1}, A_{B1}, A_{R2}, A_{G2}, A_{B2}, \ldots A_{Rm}, A_{Gm}, A_{Bm}$ of the main ridge waveguide 24 are respective transverse ridge waveguides $R_1, G_1, B_1; R_2, G_2, B_2; \ldots R_m, G_m, B_m$. This is also shown in FIGS. 2 and 3B, which are top views of the LGP 20. These transverse waveguides $R_1, G_1, B_1; R_2, G_2, B_2; \ldots R_m, G_m, B_m$ are arranged in the same plane as the ridge waveguide 24, are supported by the substrate 22 (FIG. 3C), extend in the direction parallel to the side 20b of the LGP (FIG. 2), and have butt optical coupling with the ridge waveguide 24. Holograms $A_{R1}, A_{G1}, A_{B1}, A_{R2}, A_{G2}, A_{B2}, \ldots A_{Rm}, A_{Gm}, A_{Bm}$ of the ridge waveguide 24 are constructed so that they are capable of reorienting a portion of the RGB laser lights 26 in the direction perpendicular to the ridge waveguide 24 for propagation along the transverse waveguides $R_1, G_1, B_1; R_2, G_2, B_2; \ldots R_n, G_n, B_n$, respectively. More specifically, only red light is branched into the ridge waveguides $R_1, R_2, \ldots R_m$, only green light is branched into ridge waveguides $G_1, G_2, \ldots G_m$, and only blue light is branched into ridge waveguides $B_1, B_2, \ldots B_m$.

Because of consumption of optical energy of light by the sequential holograms in the directions of propagation of light along the main ridge waveguides 24 in the direction of arrows 26a and 26b (FIG. 2), intensities of light in sequential transverse waveguides would be reduced in the downstream direction of the flow of light along the main ridge waveguide 24 if all holograms of respective color types were identical.

Figure 3C:
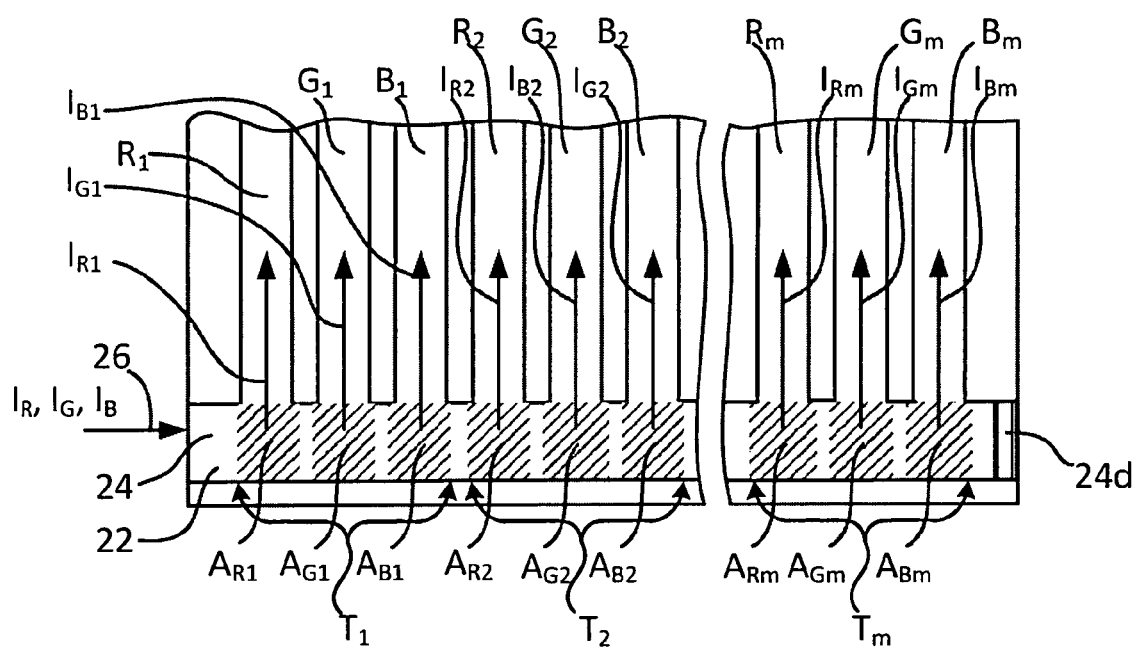
FIG. 3C is a fragmental top view of the LGP that illustrates leveling of the intensities of lights emitted from the holograms of the main ridge waveguide to the respective transverse waveguides.

In the LGP 20 of the invention, the above problem is solved by gradually changing parameters of holograms $A_{R1}, A_{G1}, A_{B1}, \ldots A_{Rm}, A_{Gm}, A_{Bm}$ so as to provide equal intensities $I_0$ of light emitted from the respective holograms $A_{R1}, A_{G1}, A_{B1}, \ldots A_{Rm}, A_{Gm}, A_{Bm}$ in the direction perpendicular to the main waveguide 24 but in the plane of the LGP 20. The above changes are explained in more detail later in this document with regard to the holographic element structure. After the above changes occur, the intensities of lights emitted from the holograms $A_{R1}, A_{G1}, A_{B1}, \ldots A_{Rm}, A_{Gm}, A_{Bm}$ into the transverse waveguides are equal in each hologram of the same color type. In FIG. 3C, which is a fragmental top view of the LGP, this is shown by the arrows $I_{R1}, I_{G1}, I_{B1}, \ldots I_{Rm}, I_{Gm}, I_{Bm}$. In other words, the design of the invention provides uniformity of illumination over the entire LGP 20.

Reference 24d in FIGS. 3B and 3C designates an absorber of residual light at the end of the ridge waveguide 24. More precisely, the intensities of light of different wavelengths in each triplet will be different. This is ignored for simplicity in the description and drawings.

Figure 4:
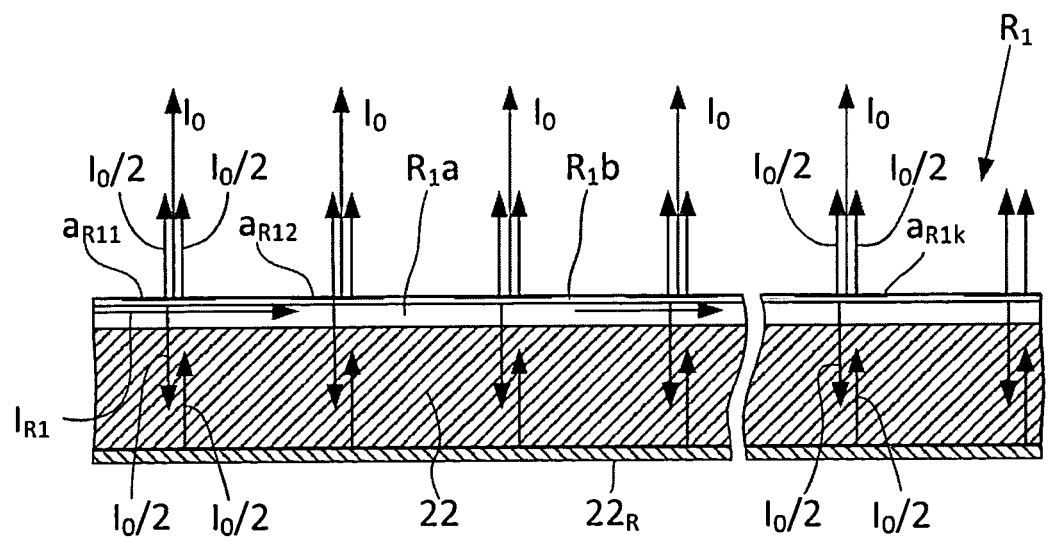
FIG. 4 is a longitudinal sectional view along the center of a transverse waveguide.

As mentioned above, attached to holograms $A_{R1}, A_{G1}, A_{B1}, A_{R2}, A_{G2}, A_{B2}, \ldots A_{Rm}, A_{Gm}, A_{Bm}$ of the ridge waveguide 24 are the respective transverse ridge waveguides $R_1, G_1, B_1; R_2, G_2, B_2; \ldots R_m, G_m, B$. (FIG. 2). These transverse waveguides $R_1, G_1, B_1; R_2, G_2, B_2; \ldots R_m, G_m, B_m$ are arranged in the same plane as the ridge waveguide 24, supported by the substrate 22, extend in the direction parallel to the side 20b of the RGB 20, and have butt optical coupling with the main ridge waveguide 24. Transverse waveguides $R_1, G_1, B_1; R_2, G_2, B_2; \ldots R_m, G_m, B_m$ are identical and may structurally be the same as the main ridge waveguide 24. FIG. 4 is a longitudinal sectional view along the center of a transverse waveguide, e.g., $R_1$, in a plane perpendicular to the substrate 22.

As shown in FIG. 4, the transverse ridge waveguide $R_1$ consists of a lower cladding $R_{1a}$ having a thickness in the range of 3 to 20 µm, preferably 5 to 10 µm, and a core $R_{1b}$ that has a thickness of 1 to 2.5 µm and that has in it upper part (having a thickness of several tens of nanometers) a plurality of sequentially arranged holograms $a_{R11}, a_{R12}, \ldots a_{R1k}, \ldots$ Similar sequentially arranged holograms $a_{G11}, a_{G12}, \ldots a_{G1n}$ are formed in the ridge waveguide $G_1$, and the holograms $a_{B1m}, a_{B1m}, \ldots a_{Bmn}$ are formed in the last ridge waveguide $B_m$ (FIG. 2). As will be shown below with reference to FIGS. 9A and 9B, the entire surface of the core 24'''b of all waveguides of the LGP 20, including the main ridge waveguide and the transverse ridge waveguides, may be coated with a continuous upper cladding layer 24'''c. The optical refractive index of this upper cladding is lower than that of the core by an amount of 1 to 3.5%. The upper cladding may have a thickness of 4 to 20 µm. If all holograms of the transverse ridge waveguide $R_1$ were identical in their performance parameters, then, the intensities of light would be reduced because of sequential consumption and optical losses in the directions of propagation of light.

In order to solve this problem, the holograms $a_{R1}, a_{R12}, \ldots a_{R1k} \ldots$ of the transverse ridge waveguides $R_1, G_1, B_1; R_2, G_2, B_2; \ldots R_n, G_n, B_n$ are constructed so that they are capable of reorienting the propagated RGB laser lights in the directions substantially perpendicular to the plane of these waveguides. This is shown in FIG. 4 by arrows, the length of which corresponds to the intensities of the lights directed perpendicular to the aforementioned waveguides. However, these holograms will reorient the light in two mutually opposite direction, i.e., upward from the substrate 22 and downward into the substrate 22. As shown in FIG. 4, in order to improve operational efficiency of the LGP 20, the backside of the substrate 22 is coated with a reflecting layer $22_R$.

As shown in FIG. 2, the holograms $a_{R11}, a_{R12}, \ldots a_{R1n} \ldots$ receive red laser light from the hologram $A_{R1}$ of the main ridge waveguide 24, the holograms $a_{G11}, a_{G12}, \ldots a_{G1n}$ receive green laser light from the hologram $A_{G1}$, of the main ridge waveguide 24, and the holograms $a_{B11}, a_{B12}, \ldots a_{B1n}$ receive blue laser light from the respective hologram $A_{B1}$ of the main ridge waveguide 24 (for simplicity of the drawing, not all of these transfer holograms are designated in FIG. 2). As shown in FIG. 3C, the holograms $A_{R1}, A_{G1}, A_{B1}, A_{R2}, A_{G2}, A_{B2}, \ldots A_{Rk}, A_{Gk}, A_{Bk}$ are grouped into triplets $T_1, T_2, \ldots T_m$ in accordance with the wavelengths and due to the specificity of their parameters. In other words, as shown in FIG. 3B, the respective transverse waveguides $R_1, R_2, \ldots R_m, G_1, G_2 \ldots G_m, B_1, B_2, \ldots B_m$ are also combined into triplets $H_1, H_2, \ldots H_m$ the number of which is "m", as defined above.

The above changes will be explained in more detail in consideration of the holographic element structure.

Figure 5A:
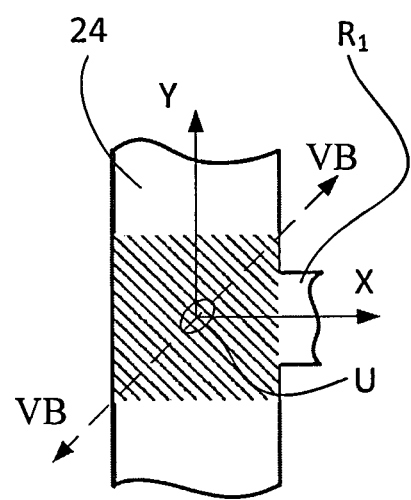
FIG. 5A is a top view of first holograms on a part of the main ridge waveguide.
Figure 5B:
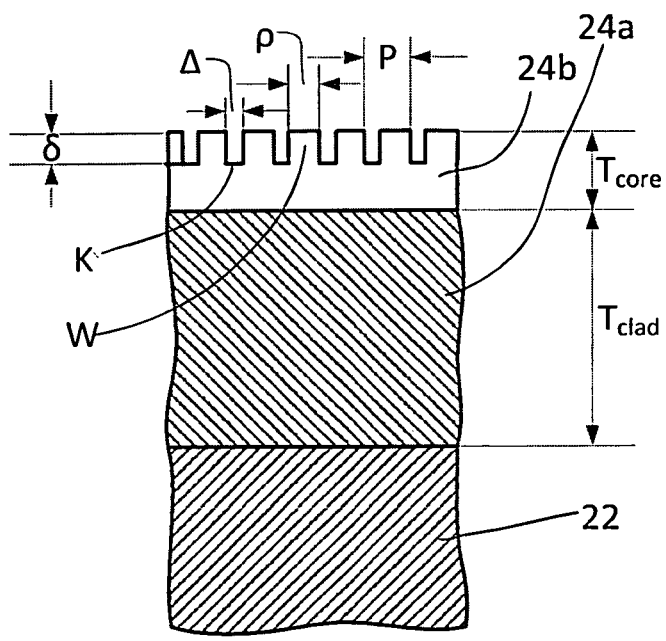
FIG. 5B is a cross-section along line VB-VB in FIG. 5A.

FIG. 5A is a top view of a hologram shown on a part of the main ridge waveguide 24. This drawing also shows a part a transverse ridge waveguide, e.g., $R_1$. FIG. 5B is a cross-section along line VB-VB of FIG. 5A. More specifically, the cross-sectional view of FIG. 5B shows a transverse structure of the first holograms: $A_{R1}, A_{G1}, A_{B1}, \ldots A_{Rm}, A_{Gm}, A_{Bm}$ produced in the form of parallel grooves. In fact, these first holograms comprise 45° planar Bragg gratings, which are formed in the plane of the main ridge waveguide 24. What is meant herein and hereinafter by the term "45° planar Bragg gratings" are regular 45° gratings with orientation of grooves and teeth of the holograms at an angle of 45° with respect to the direction of light propagation. In order to understand the orientation of the holographic elements and the light rays emitted therefrom, some drawings also contain coordinate axes X, Y, Z or Y, Z.

As shown in FIG. 5B, each groove K is characterized by the following parameters: groove width=Δ; depth=δ in the core of the main ridge waveguide plane 24; and width of the tooth W=ρ formed between the grooves. Furthermore, the aforementioned 45° planar Bragg grating is characterized by the grating pitch P of the holograms, which determine selectivity of grating with respect to the wavelengths that propagate along the main ridge waveguide 24. For example, if the wavelengths of light that propagate along the main ridge waveguide are $\lambda_R$=630 nm for the red light, $\lambda_G$=532 nm for the green light, and $\lambda_B$=450 nm for the blue light, then the grating with the pitch of holograms P=310 nm will interact only with the red light, while the lights of other colors will not interact with this grating. This is true also for any other pitch that is multiple to the pitch P. Similarly, if the wavelengths of light that propagate along the main ridge waveguide are the same as above but the pitch P is equal to 255 nm or a value multiple to this pitch, then the grating with this pitch will interact only with the green light, while the lights of other colors will not interact with this grating. The same rule applies to the blue light and the pitch P equal to 210 nm. Such selective hologram properties are the same in all "m" triplets of holograms formed in the core 24b of the main ridge waveguide 24 (refer to FIGS. 3A and 3B).

Thus, all triplets of holograms of the main ridge waveguide 24 reorient the respective lights to the transverse ridge waveguides $R_1$, $G_1$, $B_1$; $R_2$, $G_2$, $B_2$; ... $R_m$, $G_m$, $B_m$. As mentioned above, the holograms of the main ridge waveguide 24 transmit to the transverse ridge waveguides the lights of equal intensities for each specific wavelength. The reflective efficiency of the 45° planar Bragg grating depends on the number of grooves in the grating, groove depth, and width of the teeth formed between the grooves.

As described above, in all triplets $T_1$, $T_2$, ... $T_m$ intensities of lights of different wavelengths that branch from the main ridge waveguide 24 to the transverse waveguides must be equal (see FIG. 3C), whereas these intensities are not necessarily equal within the triplets.

Equalization of the aforementioned intensities (see FIG. 3C) is achieved by gradually changing the efficiency of lateral reflection in the subsequent 45° planar Bragg gratings of the main ridge waveguide 24. In fact, these gratings comprise the aforementioned first holograms: $A_{R1}$, $A_{G1}$, $A_{B1}$, ... $A_R$m, $A_{Gm}$, $A_{Bm}$. On the other hand, efficiency of lateral reflection depends on the number of grating grooves and other factors mentioned above. In each group of the first holograms, "m", which is the total number of the holograms in the group, may range from 200 to 600. In view of such a great amount of holograms on the entire LGP and since the entire light must be redistributed from the main ridge waveguide 24 to the transverse ridge waveguides $R_1$, $G_1$, $B_1$; $R_2$, $G_2$, $B_2$; ... $R_m$, $G_m$, $B_m$ over the entire LGP with the use of aforementioned holograms, the efficiency of lateral reflection may vary widely, e.g., from 0.02% to 80%.

Since it is impossible or extremely difficult to provide such a wide range of changes in reflection efficiency merely due to the number of grooves in the grating, which is practically limited to 650 for the red light, 800 for the green light, and 950 for the blue light, it is necessary to resort to other parameters of the gratings (except for the grating pitch), such as width of the teeth between the grooves, depth of the grooves, etc., or a combination of these parameters. These parameters do not affect selectivity but may change reflective efficiency.

Figure 5C:
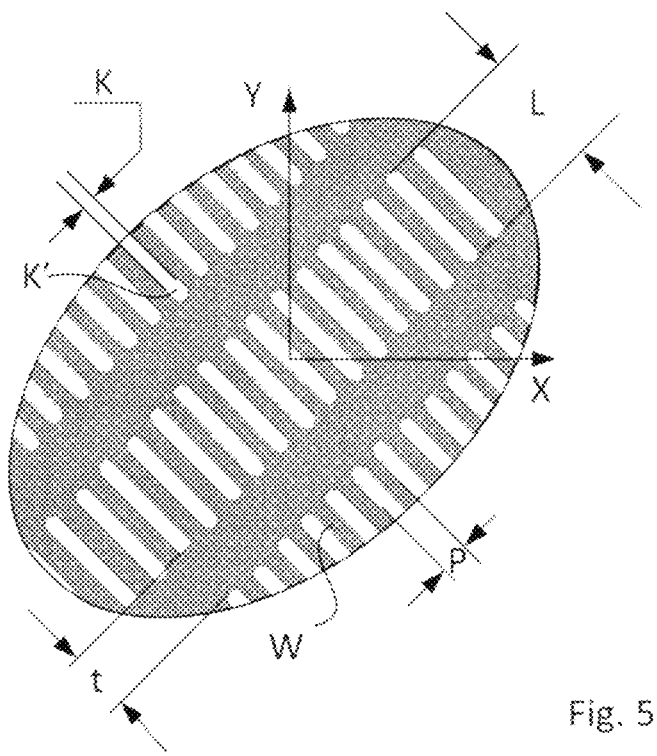
FIGS. 5C to 5F are examples of patterns of discrete linear holograms.
Figure 5D:
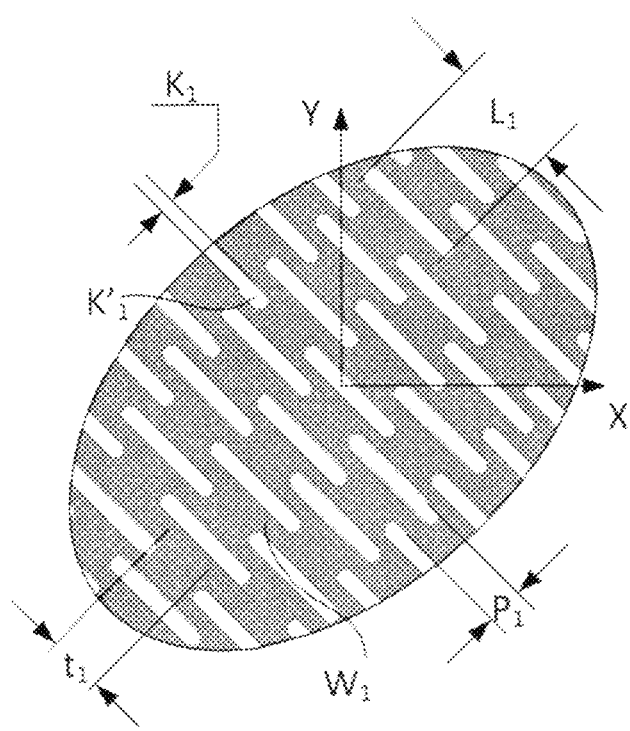
Figure 5E:
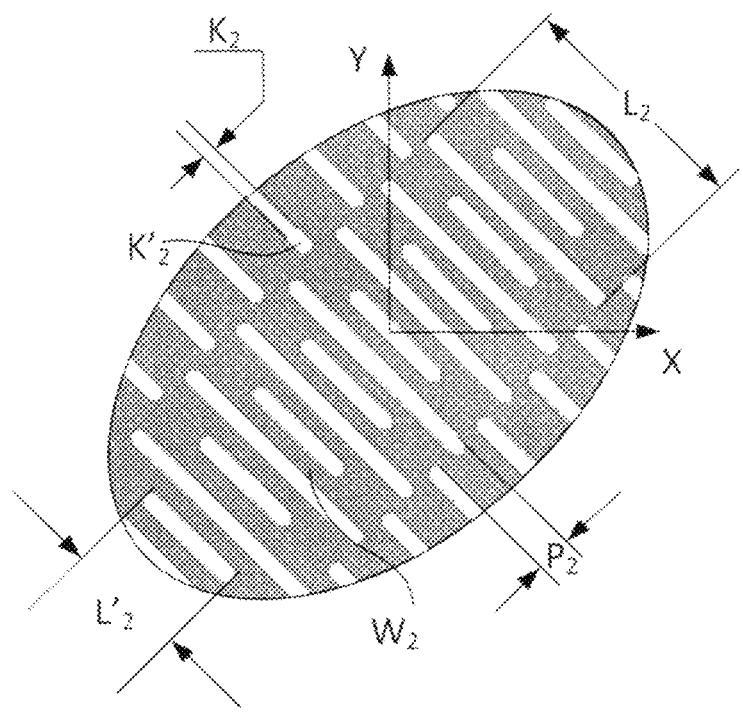
Figure 5F:
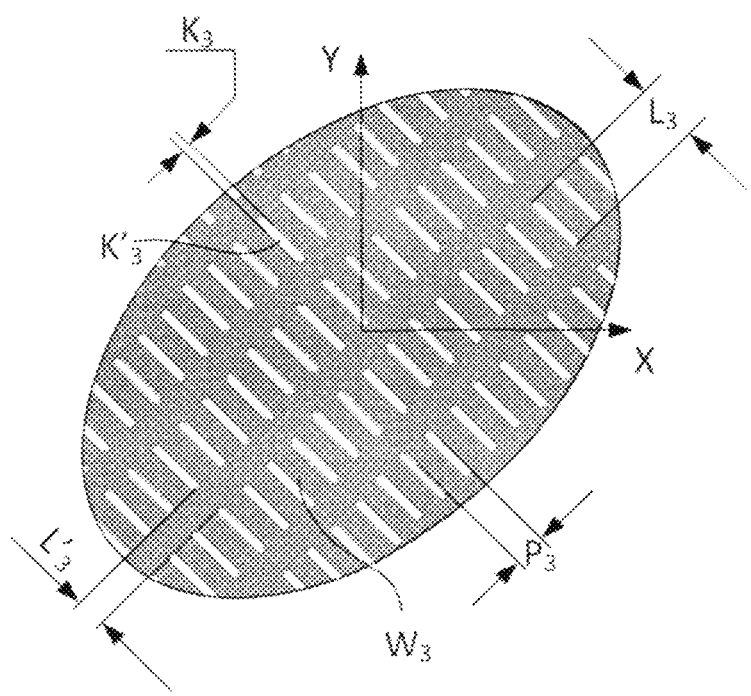

According to one or several aspects of the invention, the above problem is solved by additionally changing the pattern of the grating grooves, for example, by discretizing the grooves, as shown in FIG. 5C, which is a top view of a fragment of a Bragg grating in FIG. 5A. The term "discretizing" means interrupting the continuity of the aforementioned teeth in their longitudinal direction, whereby these teeth form a "broken line" consisting of linear sections separated from each other. In FIGS. 5C and 5D, the lengths of separated grooves are designated by L and $L_1$, and the distances between the ends of the adjacent grooves are designated by "t" and "$t_1$", respectively. The value of L, $L_1$ may vary in the range of 10 to 300 nm, and the value of "t", "$t_1$" may vary in the range of 10 to 200 nm. It is understood that these ranges are given only as examples. Variation of L, $L_1$ and "t", "$t_1$" (FIGS. 5C and 5D) and $L_2$, $L'_2$, $L_3$, $L'_3$ (FIGS. 5E and 5F) in the ranges indicated above in combination with variants of other parameters, such as W, $W_1$, $W_2$, $W_3$, K, $K_1$, $K_2$, $K'_3$ (FIGS. 5C to 5F) makes it possible to adjust the reflective efficiency of the holograms in a wide range, provided the pitch P that determines the selective capacity of the gratings remains unchanged. The values of pitch parameters P, P1, P2, and P3 shown in FIGS. 5B to 5F define the operation wavelength range for holograms of different topologies. It is understood that the topology of the gratings illustrated in FIGS. 5C to 5F is shown only as an example and that any other patterns and any other possible grating characteristics that may affect the reflective efficiency but that do not change the selectivity can be employed. It is also understood that the topologies shown in FIGS. 5C to 5F are applicable to lights of any wavelengths including the RGB. However, as has been mentioned above, for different wavelengths the values of the parameters P, P1, P2, and P3 will be different.

The equality of the intensity levels at the inputs to the transverse waveguides ($R_1$, $R_2$, ... $R_m$, for red light, $G_1$, $G_2$, ... $G_m$ for green light, and $B_1$, $B_2$, ... $B_m$ for blue light) is achieved by changing parameters of the respective holograms, which branch the lights from the main ridge waveguide 24 to respective transverse ridge waveguides $R_1$, $R_2$, ... $B_1$, $B_2$, ... $B_m$. It can be summarized, but without limitation, that these parameters are the following:

(1) density of grooves per unit of hologram surface area, in this case, in the hologram of any type the multiplicity of the grating pitch in the Bragg grating being preserved for each wavelength;
(2) width of the teeth in the grating;
(3) depth of the grooves;
(4) length of the grooves in the hologram pattern; and
(5) relative positions of the grooves.

Holograms that should work with maximum light reflective efficiency must be located at the downstream end of the optical path through the main ridge waveguide 24; holograms that should work with minimal light efficiency must be located at the upstream end of the optical path through the main ridge waveguide 24. As mentioned earlier, the reflective efficiency of the holographs of each type $R_i$, $G_i$, and $B_i$ may change from 0.02% to approximately 80%. Furthermore, the number of holograms of each type may be as high as 400 or higher, and therefore the difference in light-reflective efficiency between two adjacent holographs may be insignificant, e.g., fractions of 0.1%. Moreover, the number of grooves in the first upstream hologram may consist only of a few or a few tens of grooves, while the last downstream hologram may be filled with grooves completely, and the groove pattern may be designed for maximum possible reflection. In view of the above, it is necessary to provide a smooth transition in the reflective efficiency from hologram to hologram, and this is achieved by selecting the appropriate parameters (items 1 through 5 above).

Details of the method suitable for selection of parameters listed in items 1 through 5 are beyond the scope of the present invention and will be a subject of a separate patent application.

As mentioned above, the first holograms $A_{R1}, A_{R2}, \ldots A_{Rm}$ that are the holograms of the first type have the pitch equal to 310 nm, or a value multiple to this pitch, and may contain 50 to 650 grooves in the red light 45° planar grating, and the depth of these grooves may be 10 nm to 300 nm, preferably 20 to 40 nm. The first holograms $A_{G1}, A_{G2}, \ldots A_{Gm}$ of the second group have the pitch equal to 255 nm or a value multiple to it and may contain approximately 60 to 800 grooves in the green light 45° planar grating, and the depth of these grooves may vary from 10 nm to 300 nm, preferably 20 nm to 40 nm. Finally, the first holograms $A_{B1}, A_{B2}, \ldots A_{Bm}$ of the third type have the pitch equal to 210 nm or a value multiple to it and may contain approximately 70 to 950 grooves in the green light 45° planar grating, the depth of these grooves may vary from 10 nm to 300 nm, preferably 20 nm to 40 nm, and the width of the tooth between the adjacent grooves may vary in the range 10 to 100 nm. Such equalized intensities $I_{R1}, I_{G1}, I_{B1}, \ldots I_{Rm}, I_{Gm}, I_{Bm}$ are shown by arrows in FIG. 3C.

The light obtained by groups of transverse ridge waveguides $R_1, R_2, \ldots R_m, G_1, G_2, \ldots G_m,$ and $B_1, B_2, \ldots B_m$, which have equalized intensities in each color type, propagate through the respective waveguides across the entire the LGP 20 the surface of which they cover.

As mentioned above, the holograms $a_{R11}, a_{R12}, \ldots a_{R1k} \ldots$ of the transverse ridge waveguides $R_1, G_1, B_1; R_2, G_2, B_2; \ldots R_n, G_n, B_n$ are constructed so that they are capable of reorienting the propagated RGB laser lights in the directions at an angle to the plane of these waveguides, which, as mentioned above, may be obtained, e.g., in the range of 70 to 85°.

Figure 6A:
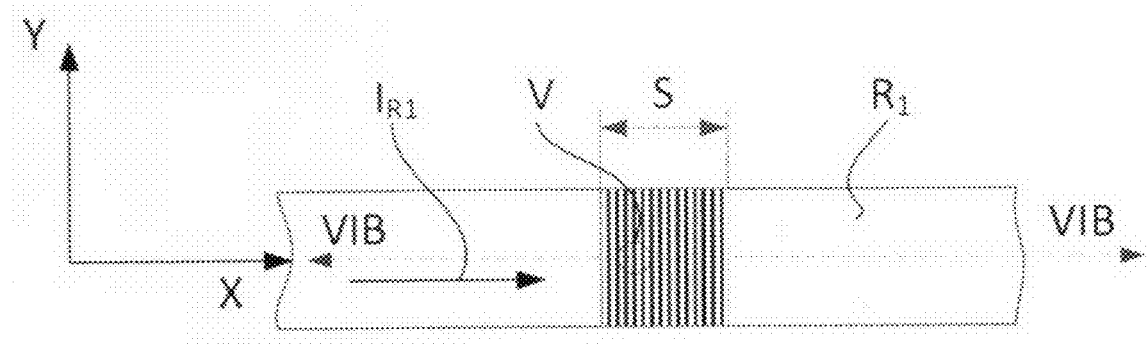
FIG. 6A is a top view of second holograms formed on one of the transverse ridge waveguides.
Figure 6B:
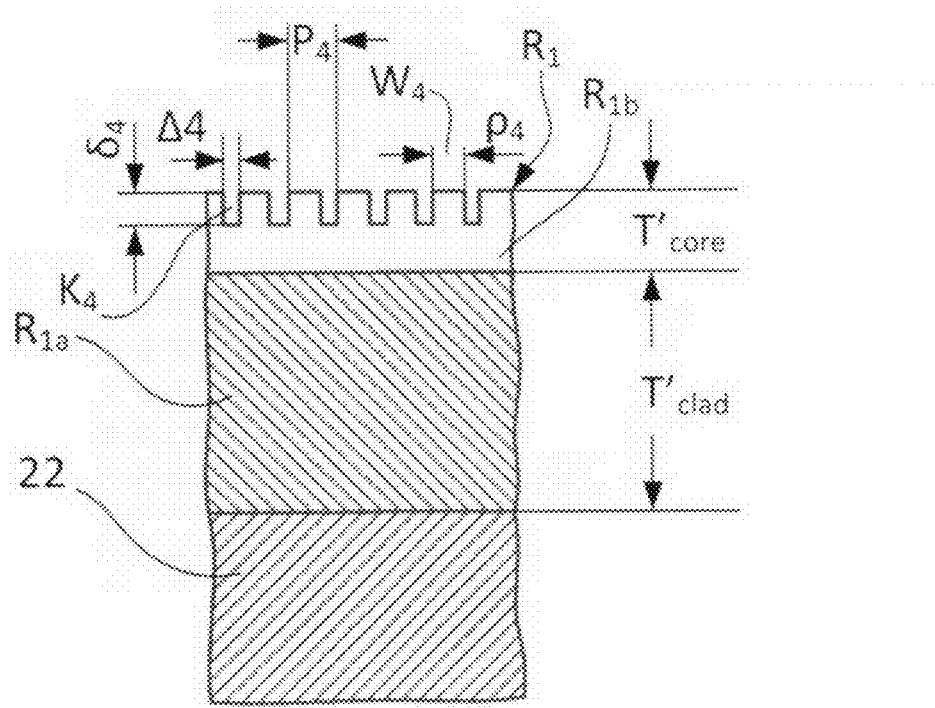
FIG. 6B is a cross-sectional view along the line VIB-VIB in FIG. 6A.
Figure 6C:
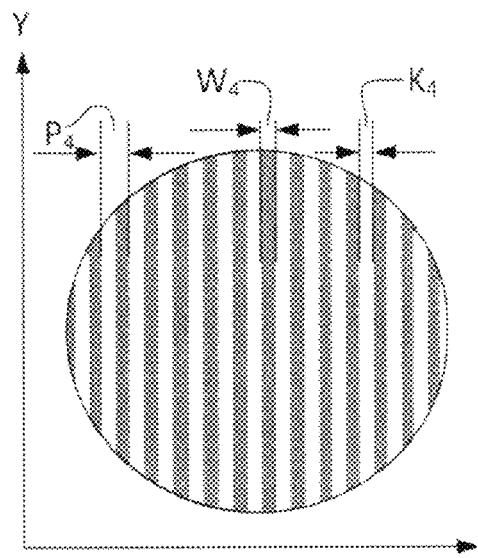
FIGS. 6C, 6D, 6E, and 6F are views of the area V in FIG. 6A shown on a larger scale and illustrating modifications of second holograms, which are formed on the surfaces of the transverse ridge waveguides.
Figure 6D:
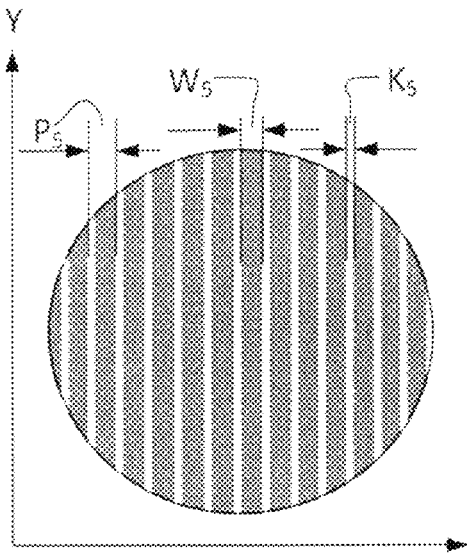

A challenge in such a reorientation and propagation of the reoriented laser lights is to ensure equality of intensities of lights emitted in the substantially perpendicular direction along the entire length of each transverse waveguide from light input to light output. In fact, this task is the same one that was solved with regard to light intensity equalization in the main ridge waveguide, and the difference is that in the transverse waveguides $R_1, G_1, B_1; R_2, G_2, B_2; \ldots R_n, G_n, B_n$, the lights are emitted in the direction defined by the aforementioned angle to the surface of the LGP 20. In view of the above, the holograms $a_{R11}, a_{12}, \ldots a_{R1k} \ldots$, which we refer to as "second holograms", which accomplish this function, have a design different from the design of the first holograms, i.e., $A_{R1}, A_{G1}, A_{B1}, \ldots A_{Rm}, A_{Gm}, A_{Bm}$. Design of a hologram, e.g., hologram $a_{R11}$ for red light, is shown in FIGS. 6A to 6F, where FIG. 6A is a top view, FIG. 6B is a cross-sectional view along the line VIB-VIB of FIG. 6A, and FIGS. 6C, 6D, 6E and 6F are views of the area V (FIG. 6A) which is shown on a larger scale and illustrates modifications of second holograms, which are formed in the surfaces of the transverse ridge waveguides $R_1, G_1, B_1; R_2, G_2, B_2; \ldots R_n, G_n, B_n$ (FIGS. 1 and 2). The aforementioned waveguides form sequential triplets $H_1, H_2, \ldots, H_m$ (FIG. 3B). Each such triplet is intended for transmitting RGB lights over the surface of the substrate 22.

Important to note here is that, in spite of all optical conversions, polarization of light remains unchanged from input to the main waveguide to the output from the transverse waveguides. According to the invention, the second holograms $a_{R11}, a_{R12}, \ldots a_{R1k} \ldots$ form gratings of various lateral topology having grooves, which are perpendicular to the direction of light propagation.

According to one aspect of the invention, the second holograms also may be formed as grooves and teeth that form gratings. As shown in FIG. 6B, the hologram of the transverse ridge waveguide comprises a structure formed in the core $R_{1b}$ of a waveguide (in the illustrated example, in the core of the waveguide $R_1$) and produced as a set of parallel grooves $K_4$ and teeth $W_4$ between the grooves. In fact, the structure shown in FIG. 6B is similar to one shown in FIG. 4 in that it has a substrate 22, a cladding $R_{1a}$, and a core $R_{1b}$ in which the holograms are formed. In the transverse ridge waveguides, the teeth may have a width in the range of 10 nm to 300 nm and the grooves may have a width in the range of 10 nm to 500 nm and a depth in the range of 10 nm to 300 nm. In FIG. 6A, symbol S designates the length of the hologram that can be selected in the range of 3 μm to 300 μm. It is understood that the hologram is composed of a plurality of individual holographic components having light-reflecting surfaces perpendicular to the direction of light that propagates through the transverse ridge waveguide $R_1$. The light-reorientation capacity, and, hence, the reflective efficiency of the hologram depends on such factors as: (1) grating pitch, (2) width of the teeth, (3) width of grooves, (4) depth of grooves, and (5) length of hologram.

As in the main ridge waveguide 24, in a transverse waveguide the number of holograms may vary from 200 to 600. Therefore, the difference in light-reflective efficiency between two adjacent holographs of the transverse ridge waveguide will be insignificant, e.g., fractions of 0.1%. Moreover, the number of grooves in the first upstream hologram may consist of only a few or tens of grooves, while the last downstream hologram of the transverse ridge waveguide may be filled with grooves completely and the groove pattern will be designed for maximum possible reflection in the direction perpendicular to the transverse waveguide. In view of the above, it is necessary to provide a smooth transition in the reflective efficiency from hologram to hologram, and this is achieved by appropriate selection and combination of parameters (listed in items 1 through 5 in the previous paragraph).

Figure 6E:
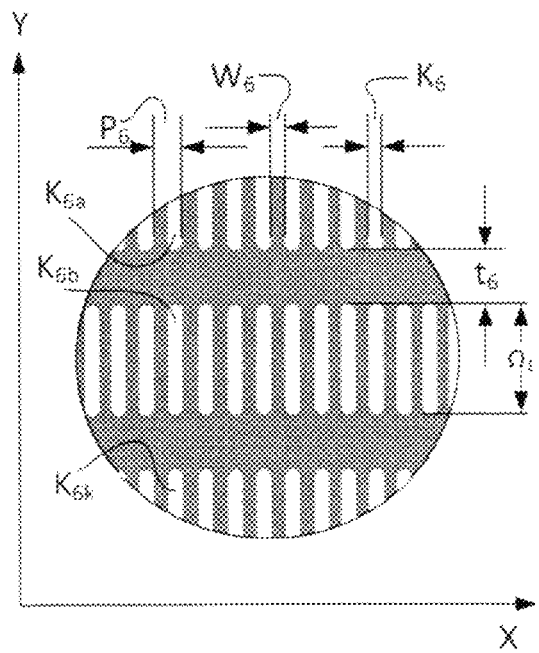
Figure 6F:
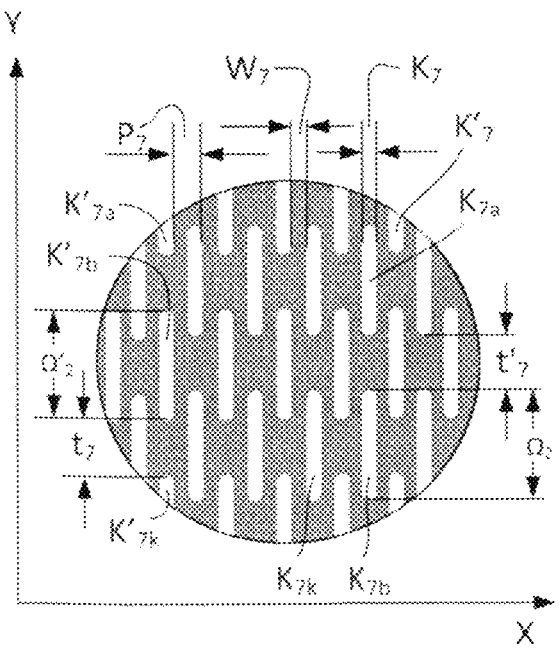

According to one or several aspects of the invention, adjustment capabilities in the design of the gratings in the transverse ridge waveguides can be broadened by additionally changing the pattern of grating grooves, for example, by discretization of the grooves, as shown in FIGS. 6E and 6F, which are top views of the fragment V of the grating having the length S in FIG. 6A. The term "discretization" means interruption in the continuity of the aforementioned teeth in their longitudinal direction, whereby these teeth form a "broken line" (FIG. 6E) consisting of separated grooves $K_{6a}, K_{6b}, \ldots K_{6k}$. In FIGS. 6E, the length of separated grooves $K_{6a}, K_{6b}, \ldots K_{6k}$ is designated by $\Omega_1$ and the distance between the ends of the adjacent grooves is designated by "$t_6$". In FIGS. 6F, the lengths of separated grooves $K_{7a}, K_{7b}, \ldots K_{7k}$ and $K'_{7a}, K'_{7b}, \ldots K'_{7k}$ are designated by $\Omega_2$ and $\Omega'_2$, and the distances between the ends of the adjacent grooves are designated by "$t_7$" and "$t'_7$", respectively. The values of $\Omega_1, \Omega_2, \Omega'_2$ may vary in the range of 10 to 500 nm, and the value of "$t_6$", "$t_7$" and "$t'_7$" may vary in the range of 10 to 200 nm. It is understood that these ranges are given only as examples. Variations of $\Omega_1, \Omega_2, \Omega'_2,$ and "$t_6$", "$t_7$" and "$t'_7$" in the indicated ranges in combination with variants of other parameters make it possible to adjust the reflective efficiency of the holograms in a wide range.

Figure 7A:
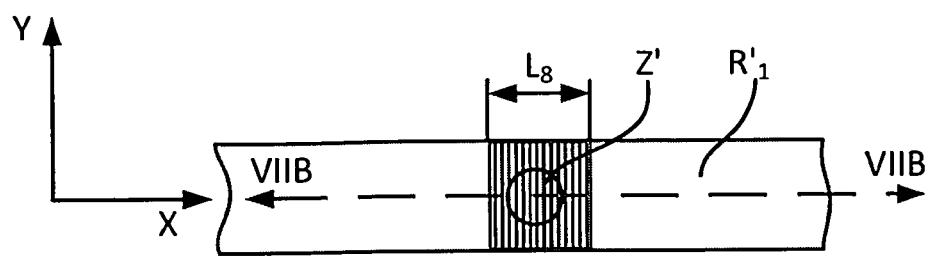
FIG. 7A is a top view of second holograms formed on one of the transverse ridge waveguides with a variable pitch.
Figure 7B:
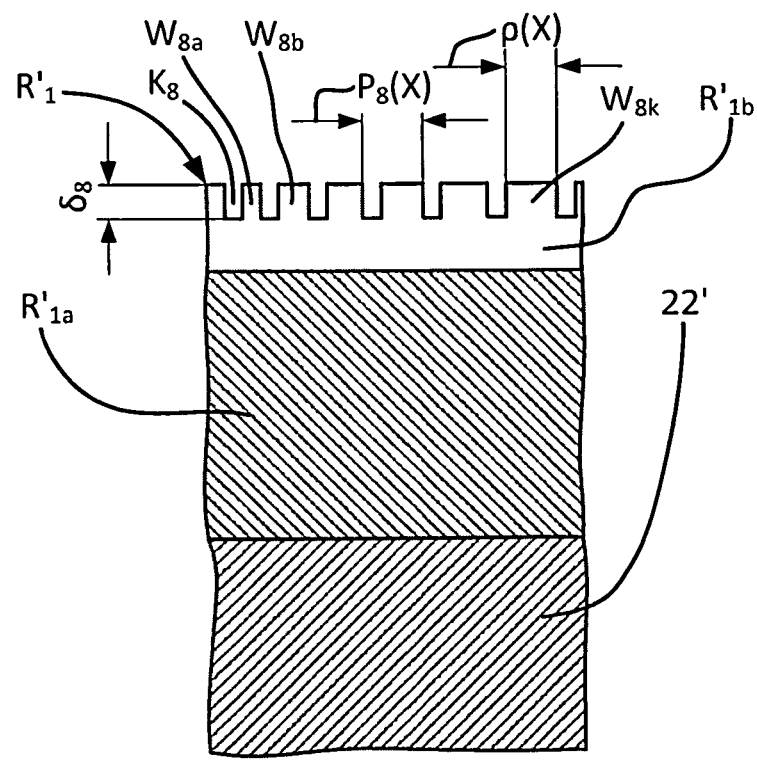
FIG. 7B is a cross-sectional view along the line VIIB-VIIB in FIG. 7A.
Figure 7C:
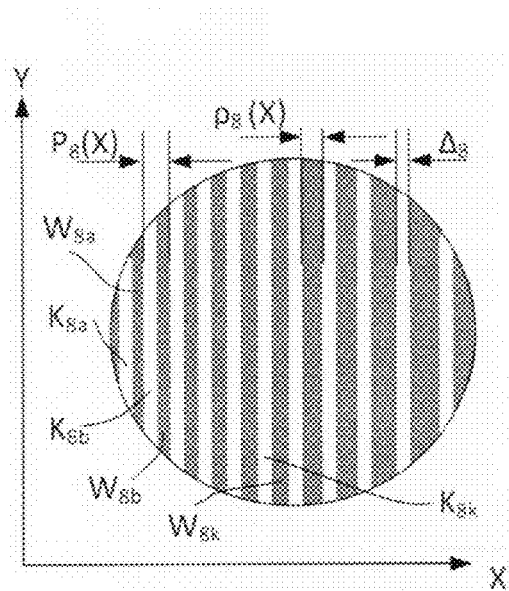
FIGS. 7C, 7D, 7E, and 7F are views of the area Z' in FIG. 7A shown on a larger scale and illustrating the modifications of second holograms, which holographic elements are formed on the surfaces of the transverse ridge waveguides with a variable pitch.
Figure 7D:
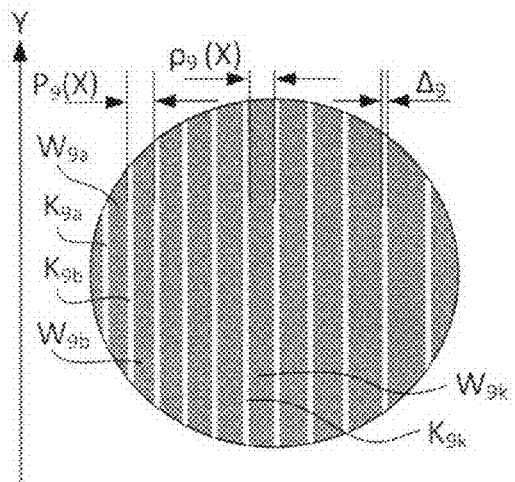
Figure 7E:
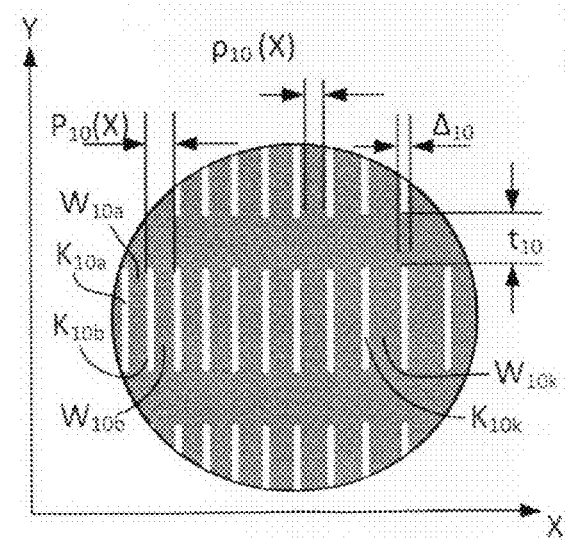
Figure 7F:
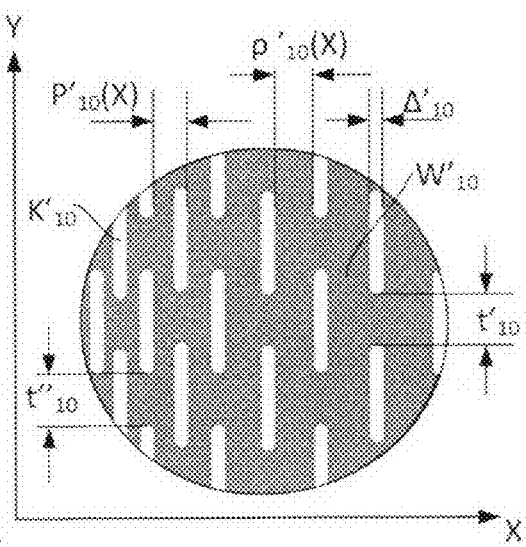

According to one or several aspects of the invention, the second holograms of the transverse ridge waveguides may be arranged with a variable pitch. FIG. 7A is a top view of a hologram with linear holograms arranged on a transverse waveguide with a variable pitch. FIG. 7B is a cross-sectional view along the line VIIB-VIIB in FIG. 7A, and FIGS. 7C, 7D, 7E, and 7F are views of the area Z' in FIG. 7A shown on a larger scale and illustrating modifications of second holograms, which are formed on the surfaces of the transverse ridge waveguides as continuous linear or discrete linear sections of grooves and teeth.

The term "variable pitch" means a grating pitch having a smooth variation. More specifically, if we assume that each holographic element has an input end and an output end, then, if the central part of a hologram has a certain pitch P that determines emission of light substantially perpendicular to the plane of the waveguide, the decrease of the pitch at the input end and increase of the pitch at the output end will provide gradual divergence of the light beam emitted by the hologram in the plane, which is perpendicular to the LGP plane and which extends along the waveguide.

In FIGS. 7C to 7F, parameters $P_8(X)$, $P_9(X)$, $P_{10}(X)$, and $P'_{10}(X)$ are functions of X coordinate, where X is the abscissa axis shown in FIG. 7A. $\rho_8(X)$, $\rho_9(X)$, $\rho_{10}(X)$, and $\rho'_{10}(X)$ are widths of the holographic element teeth, which are also X functions, where X is the abscissa axis shown in FIG. 7A.

In FIGS. 7C to 7F, parameters $\Delta_8$, $\Delta_9$, $\Delta_{10}$, $\Delta'_{10}$, are widths of the grooves $K_{8a}$, $K_{8b}$, ... $K_{8k}$, ... $K_{9a}$, $K_{9b}$, ... $K_9$, ...; $K_{10a}$, $K_{10b}$, ... $K_{10k}$, ...; $K'_{10a}$, $K'_{10b}$, ... $K'_{10k}$, ... between the adjacent teeth $W_{8a}$, $W_{8b}$, ... $W_{8k}$, ...; $W_{9a}$, $W_{9b}$, ... $W_{9k}$, ...; $W_{10a}$, $W_{10b}$, ... $W_{10k}$, ...; $W'_{10a}$, $W'_{10b}$, ... $W'_{10k}$ ... of the holograms.

By varying parameters $\rho(X)$ and $\Delta(X)$ for teeth W and grooves K, it is possible to provide equal variations of pitch P along axis X, i.e., along a waveguide. Also, light-emission hologram efficiency depends on the relationship between the parameters $\rho(X)$ and $\Delta(X)$. Thus, by changing the ratios between $\rho(X)$ and $\Delta(X)$, it becomes possible to adjust efficiency of the holograms formed in the waveguide and thus to adjust efficiency of the light emission. Use of discrete holographic element sections with the additional parameters of distance "$t_{10}$", "$t'_{10}$", and "$t''_{10}$" between the ends of the grooves further broadens adjustment possibilities. The aforementioned variations in pitch make it possible to maintain the aforementioned divergence constant.

Figure 8A:
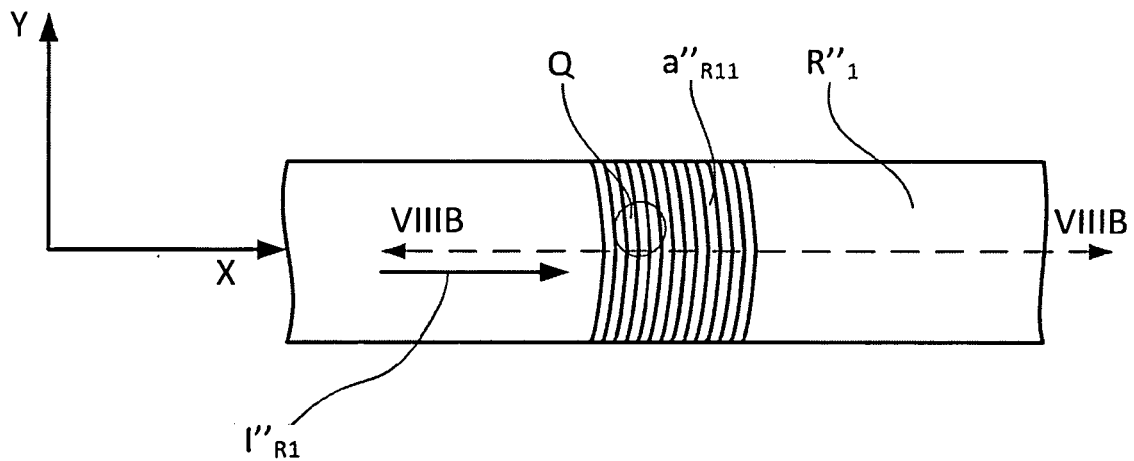
FIG. 8A is a top view of second holograms, which holographic elements have a curvilinear shape formed on one of the transverse ridge waveguides.
Figure 8B:
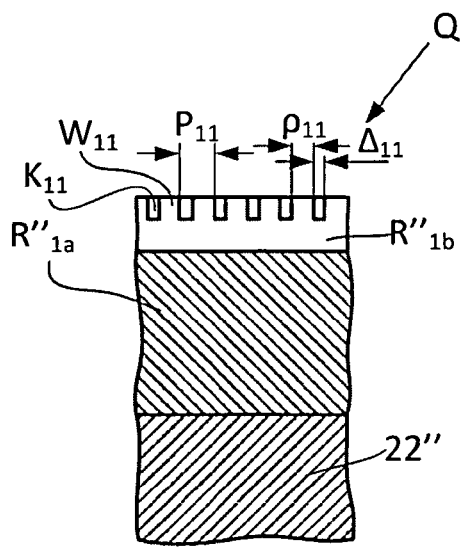
FIG. 8B is a cross-sectional view along the line VIIIB-VIIIB in FIG. 8A.

FIG. 8A is a top view of a hologram with curvilinear holographic elements arranged on a transverse waveguide. FIG. 8B is a cross-sectional view along the line VIIIB-VIIIB in FIG. 8A, and FIGS. 8C, 8D, 8E, and 8F are views of the area Q in FIG. 8A that illustrate modifications of second holograms formed in the surfaces of the transverse ridge waveguides as continuous curved or discrete curvilinear sections of the holographic elements.

Figure 8C:
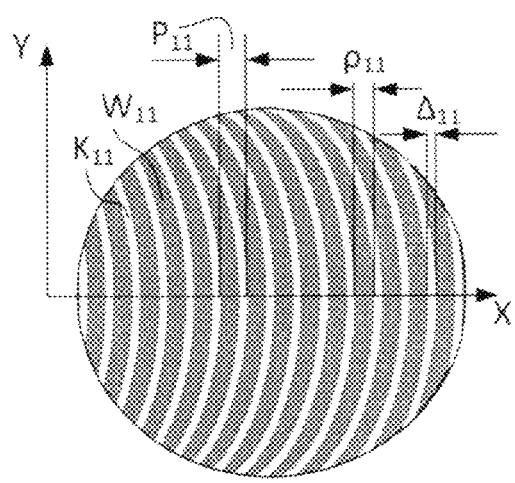
FIGS. 8C, 8D, 8E, and 8F are views of the area Q in FIG. 8A shown on a larger scale and illustrating modifications of second holograms, which are formed on the surfaces of the core of transverse ridge waveguides and holographic elements arranged with a regular and a variable pitch.
Figure 8D:
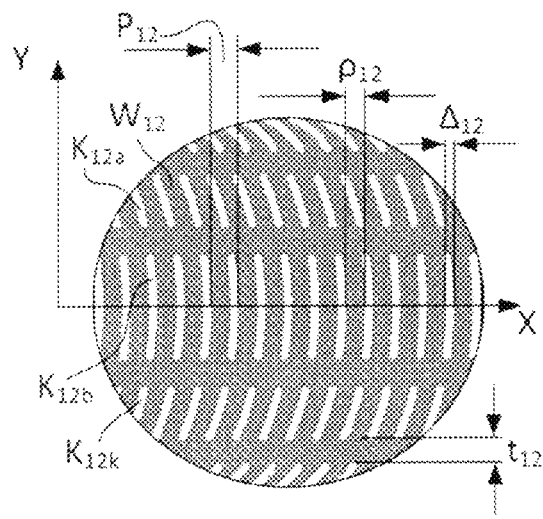

In FIGS. 8C and 8D the parameters $P_{11}(X)$, $P_{12}(X)$ are pitches of curved holograms. Merely as an example, the curved profiles of the holographic elements are hyperbolic. In FIG. 8C the grooves $K_{11}$ and teeth $W_{11}$ are continuous, and in FIG. 8D the curved holograms are shown as curvilinear, e.g., hyperbolic sections of the holographic elements $K_{12a}$, $K_{12b}$, ..., $K_{12k}$ ... separated from each other at the distance "$t_{12}$". In FIGS. 8C and 8D, the parameters $\Delta_{11}$ and $\Delta_{12}$ are widths of the grooves between adjacent teeth of the holograms. The pitches of the gratings shown in FIGS. 8C and 8D are $P_{11}=\Delta_{11}+\rho_{11}$ and $P_{12}=\Delta_{12}+\rho_{12}$, respectively.

The hyperbolic shapes of the holograms are preferable since they allow introduction of given diversions of light emitted from the respective holograms in the plane Z-Y perpendicular to the waveguide (see FIG. 1).

It is understood that by varying parameters $\Delta_{11}$, $\Delta_{12}$ and $\rho_{11}$ and $\rho_{12}$, it is possible to provide equal pitches $P_{11}$ and $P_{12}$ along the axis X, i.e., along the waveguide. It is also understood that the light-emission hologram efficiency depends on the relationship between parameters p and A. Thus, by changing ratios between $\Delta_{11}$, $\Delta_{12}$ and $\rho_{11}$ and $\rho_{12}$ respectively, it becomes possible to adjust efficiency of the holograms formed in the waveguide and thus to adjust efficiency of light emission. Use of discrete sections of the holographic elements $K_{12a}$, $K_{12b}$, ..., $K_{12k}$ ...; $K_{13a}$, $K_{13b}$, ..., $K_{13k}$ ...; $K_{14a}$, $K_{14b}$, ..., $K_{14k}$ ...; $W_{12a}$, $W_{12b}$, ..., $W_{12k}$ ...; $W_{13a}$, $W_{13b}$, ..., $W_{13k}$ ...; $W_{14a}$, $W_{14b}$, ..., $W_{14k}$ ... with the additional parameters of distance "$t_{12}$", "$t_{13}$", "$t_{14}$" (FIGS. 8D to 8F) between grooves further broadens adjustment possibilities.

Figure 8E:
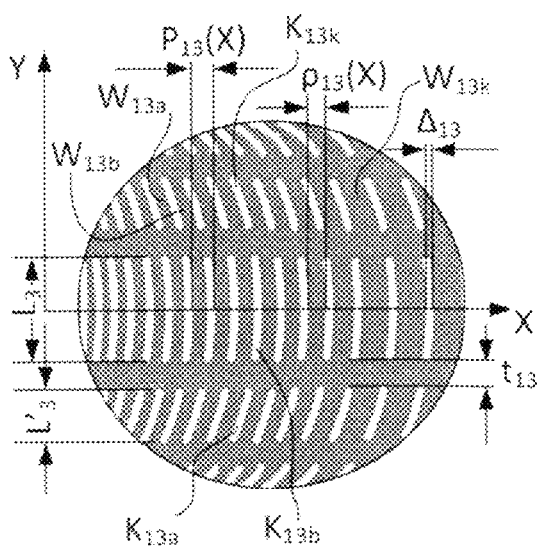
Figure 8F:
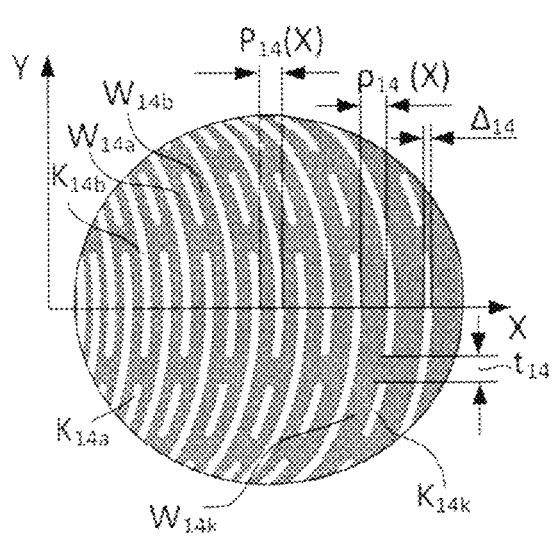

Regarding modifications of the hologram patterns shown in FIGS. 8E and 8F, it can be seen that these patterns differ from those in FIG. 8D because in addition to discretion, the pitch of the holograms can vary, and the length of the sections of the holographic elements $K_{13a}$, $K_{13b}$, ..., $K_{13k}$ ...; $K_{14a}$, $K_{14b}$, ... $K_{14k}$ ... can vary as well (for simplicity of the drawings these holographic elements are generalized as $K_{13}$ and $K_{14}$). Such a set of hologram parameters makes it possible to emit light in the form of a three-dimensional diverging beam having a given solid angle.

Figures 9A, 9B:
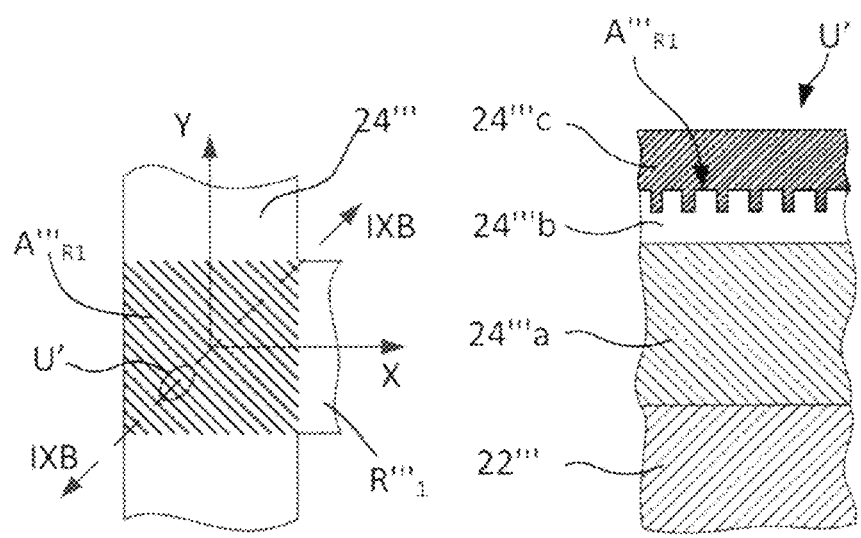
FIG. 9A is a view similar to FIG. 5A but for the first holograms coated with an upper cladding.
FIG. 9B is a cross-sectional view of area U' along the line IXB-IXB in FIG. 9A.

FIGS. 9A and 9B show a modification of the LGP structure which is similar to the structure of FIG. 5A but has an upper cladding 24'''c that covers the first holograms $A'''_{R1}$, $A'''_{G1}$, $A'''_{B1}$, $A'''_{R2}$, $A'''_{G2}$, $A'''_{B2}$, ... $A'''_{Rm}$, $A'''_{Gm}$, $A'''_{Bm}$ with a continuous coating layer (only the first hologram $A'''_{R1}$ is shown in FIGS. 9A and 9B). Here, FIG. 9A is a top view of a part of the main ridge waveguide 24''' coated with the upper cladding 24'''c, and FIG. 9B is a cross-sectional view along the line IXB-IXB of area U' in FIG. 9A. In these drawings, reference $R'''_1$ designates a transverse ridge waveguide, 24'''b designates the core, 24'''a designates the lower cladding, and 22''' designates the substrate.

Figures 9C, 9D:
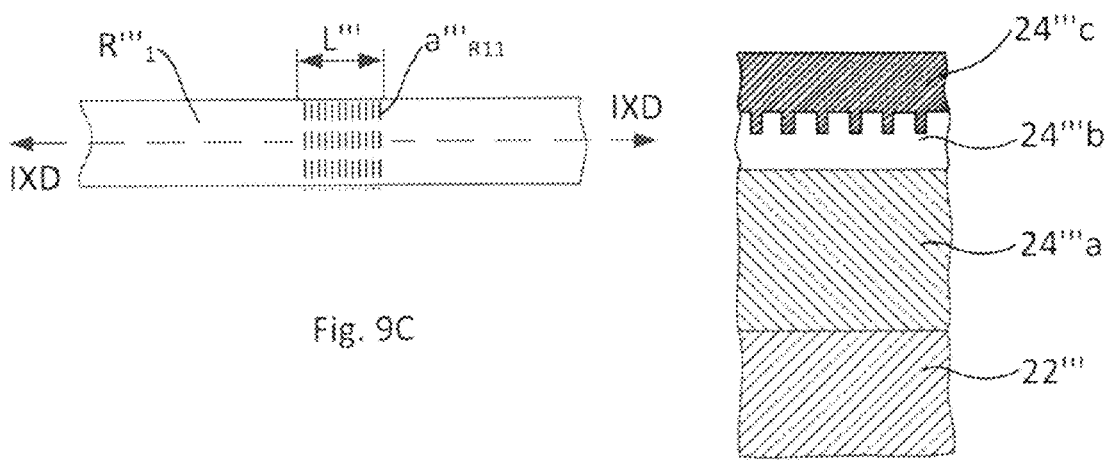
FIG. 9C is a view similar to FIG. 5A but for the second holograms coated with an upper cladding.
FIG. 9D is a cross-sectional view along the line IXD-IXD in FIG. 9C.

FIGS. 9C and 9D show a modification of the LGP structure which is similar to the structure in FIG. 6A but has an upper cladding that covers the second holograms $a'''_{R11}$, $a'''_{R12}$, ... $a'''_{R1n}$; $a'''_{G11}$, $a'''_{G12}$, ... $a'''_{G1n}$; $a'''_{B11}$, $a'''_{B12}$, ... $a'''_{B1n}$ with a continuous coating layer (only the second hologram $a'''_{R11}$ is shown in FIGS. 9C and 9D).

FIG. 9C is a top view of a part of the transverse ridge waveguide $R'''_1$ coated with the upper cladding 24''c, and FIG. 9D is a cross-sectional view along the line IXD-IXD of area U' of the hologram $a'''_{R11}$ in FIG. 9C. In these drawings, reference $R'''_1$ designates a transverse ridge waveguide, 24'''b designates the core, 24'''a designates the lower cladding, and 22''' designates the substrate.

Figure 9E:
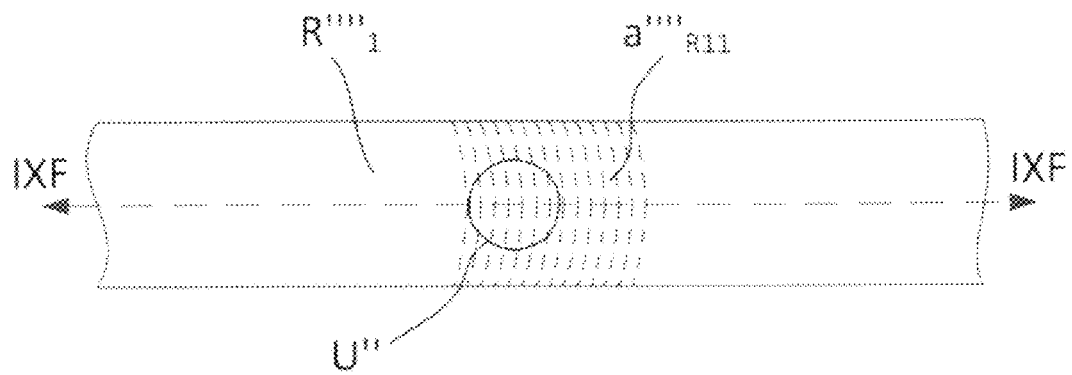
FIG. 9E is a view similar to one shown in FIG. 9C but with arrangement of the holographic elements along hyperbolic lines.
Figure 9F:
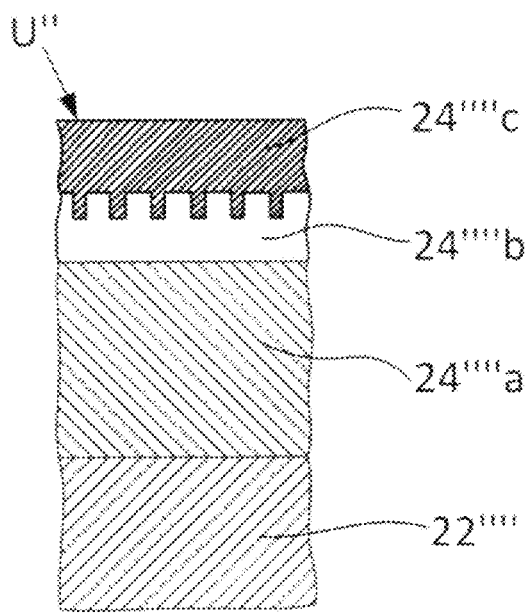
FIG. 9F is a cross-sectional view along the line IXF-IXF in FIG. 9E.

FIGS. 9E and 9F show a modification of the LGP structure which is similar to the structure in FIG. 9C, wherein the holograms $a''''_{R11}$, $A''''_{R12}$, ... $a''''_{R1n}$; $a''''_{G11}$, $a''''_{G12}$, ... $a''''_{G1n}$, $a''''_{B11}$, $a''''_{B12}$, ... $a''''_{B1n}$ arranged along the hyperbolic lines (only the hologram $a''''_{R11}$ is shown in FIGS. 9E and 9F). FIG. 9F is a cross-sectional view along the line IXF-IXF in FIG. 9E. In these drawings, reference $R''''_1$ designates a transverse ridge waveguide, $a''''_{R11}$ designates holograms, 24''''a is the upper cladding, 24''''b is the core, and 22'''' is the substrate.

Figure 10A:
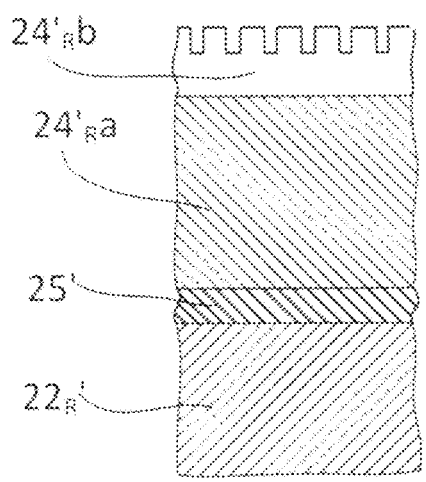
FIG. 10A is a view similar to FIG. 5B but with inclusion of a reflective layer between the substrate and the lower cladding.

FIG. 10A shows a modification of the LGP having a structure similar to one shown in FIG. 5B but with inclusion of a reflective layer 25' between the substrate $22'_R$ and the lower cladding $24'_R a$.

Figure 10B:
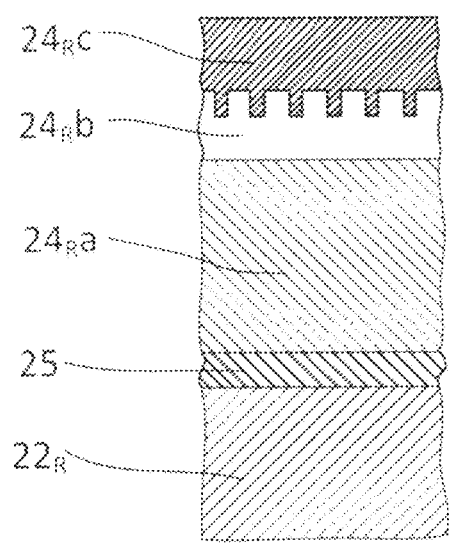
FIG. 10B is a view similar to FIG. 9D but with inclusion of a reflective layer between the substrate and the lower cladding.

FIG. 10B shows a modification of the LGP having a structure similar to one shown in FIG. 9D but with inclusion of a reflective layer 25 between the substrate $22_R$ and the lower cladding $24_R a$. Reference $24_R c$ designates the upper cladding that coats the core $24_R b$.

LGPs of all modifications shown in FIGS. 1 to FIG. 10B operate in a similar manner. Therefore, operation of the LGP is described below only with reference to modification of the LGP 20 shown in FIGS. 1 and 2.

The LGP 20 operates in the following manner. Polarized laser light 26 (FIG. 2) generated, e.g., by semiconductor lasers (preferably red green and blue lasers, which are not shown in the drawings) is applied to the optical main ridge waveguide 24 that is formed on the surface of the substrate 22. While the light flow propagates through the main ridge waveguide 24, the light components of predetermined wavelengths, i.e., the components of red, green, and blue lights, interact with first holograms only of predetermined types. Thus, in all triplets $H_1, H_2, \ldots H_m$ (FIG. 3C), the holograms $A_{R1}, A_{R2}, \ldots A_{Rm}$ will interact only with red light, the holograms $A_{G2}, A_{G2}, \ldots A_{Gm}$ will interact only with green light, and the holograms $A_{B1}, A_{B2}, \ldots A_{Bm}$ will interact only with blue light.

When the light of a predetermined wavelength interacts with its respective first holographic element, the latter changes the direction of light propagation by 90° and sends the light to the transverse ridge waveguide that is optically connected to this first holographic element. For example, the first holographic element $A_{R1}$ of the first type will send the flow of red light to the transverse ridge waveguide $R_1$, to which it is optically coupled. The first holographic element $A_{G1}$ of the second type will send the flow of green light to the respective transverse ridge waveguide $G_1$, and so on.

While propagating through the transverse ridge waveguides, the lights of predetermined wavelengths will be reoriented by means of the second holograms. Thus, the second holograms $a_{R11}, a_{R12}, \ldots a_{R1k} \ldots$ will send the beams of red light in the upward direction at an angle of 70 to 85° to the plane of the substrate 22. The same process will occur for the second holograms $a_{G11}, a_{G12}, \ldots a_{G1k} \ldots$ for the green light, etc.

Thus, the entire RGB light will be irradiated in the upward direction from the LGP 20 of the invention at an angle close to normal. For the reasons described above in the description of the LGP design, the emitted light will be distributed over the LGP surface uniformly. Furthermore, the output light beams will be organized into a matrix that will coincide with the LC matrix of the display (not shown) for which the LGP is designed.

Since the design of the LGP 20 of the invention does not change the polarization nature of light from input to output of the LGP, the LCD assembly can be produced without a polarizing layer and color filters. This drastically simplifies construction and reduces manufacturing cost.

Although the LGP of this invention has been described in considerable detail with reference to certain preferred variations thereof, other variations are possible. Therefore, the spirit and scope of the appended claims should not be limited to the preferred variations described herein. In other words, various changes and modifications are possible provided that they do not depart beyond the scope of the claims. For example, laser light sources with different wavelengths can be used. Groups of holograms may contain elements of more than three types, for example, a yellow-light wavelength can be added, thus forming quadruplets instead of triplets. The first holograms may be organized in arbitrary sequences. Alternatively, groups may be composed of holograms of two types. The ratio of LGP sides may be different from those shown in the drawings. Patterns of holograms may have a variety of topologies other than those shown in FIGS. 5A to 8F, which were shown only as examples.

The invention claimed is:

1. A light-guide panel for a display with laser backlight comprising:
   a layered structure having at least a first side and a second side and comprising a substrate, a lower cladding on the substrate, and a core having a thickness; a laser light source arranged along at least the first side;
   a main ridge waveguide arranged along the first side in the form of a strip and comprising
   a plurality of first holograms formed in an upper part of the thickness of the core and arranged in sequence along the main ridge waveguide, the first holograms lying in a same plane as the main ridge waveguide and having a design that changes a direction of a laser light which propagates along the main ridge waveguide to a direction that is perpendicular to the main ridge waveguide but remains in the same plane, the first holograms being divided into a plurality of types, the holograms of each type interacting with a light of a predetermined wavelength and ignoring light of other wavelengths, the first holograms of different types being organized into identical groups and these identical groups being arranged in sequence along the main ridge waveguide;
   a plurality of transverse ridge waveguides that are spaced from each other, formed in the upper part of the thickness of the core, and extend parallel to the second side of the light-guiding panel, each transverse ridge waveguide of said plurality being optically coupled with one type of the first holograms of the main ridge waveguide; and
   each transverse ridge waveguide comprising a plurality of sequentially arranged second holograms that interact with the lights of wavelengths of those first holograms to which they are optically coupled, said second holograms having a design that changes a direction of laser light which propagates along the respective transverse ridge waveguides in a direction substantially perpendicular to a plane of the transverse ridge waveguides.

2. The light-guide panel for a display with laser backlight according to claim 1, wherein the first holograms and the second holograms comprise grooves and teeth between the grooves, in each identical group of holograms the holograms of each type being arranged with a predetermined pitch.

3. The light-guide panel for a display with laser backlight according to claim 2, wherein the first holograms comprise holograms of 45° gratings.

4. The light-guide panel for a display with laser backlight according to claim 3, wherein each identical group of the first holograms comprises holograms of at least three types that interact with wavelengths of red light, green light, and blue light, respectively.

5. The light-guide panel for a display with laser backlight according to claim 4, wherein the teeth of the holograms comprise linear sections separated from each other.

6. The light-guide panel for a display with laser backlight according to claim 4, wherein the teeth of the holograms comprise curvilinear sections separated from each other.

7. The light-guide panel for a display with laser backlight according to claim 6, wherein the curvilinear sections are hyperbolic sections.

8. The light-guide panel for a display with laser backlight according to claim 5, wherein said pitch is variable.

9. The light-guide panel for a display with laser backlight according to claim 6, wherein said pitch is variable.

10. The light-guide panel for a display with laser backlight according to claim 1, further comprising an upper cladding that is made from an optically transparent material having a coefficient of refraction that is lower than a coefficient of refraction of the core and that covers the core in a form of a continuous layer.

11. The light-guide panel for a display with laser backlight according to claim 10, wherein the coefficient of refraction of the upper cladding is lower than the coefficient of refraction of the core.

12. The light-guide panel for a display with laser backlight according to claim 4, further comprising an upper cladding that is made from an optically transparent material having a coefficient of refraction that is lower than a coefficient of refraction of the core and that covers the core in a form of a continuous layer.

13. The light-guide panel for a display with laser backlight according to claim 12, wherein the coefficient of refraction of the upper cladding is lower than the coefficient of refraction of the core.

14. The light-guide panel for a display with laser backlight according to claim 6, further comprising an upper cladding that is made from an optically transparent material having a coefficient of refraction that is lower than a coefficient of refraction of the core and that covers the core in a form of a continuous layer.

15. The light-guide panel for a display with laser backlight according to claim 14, wherein the coefficient of refraction of the upper cladding is lower than the coefficient of refraction of the core.

16. light-guide panel for a display with laser backlight according to claim 9, further comprising an upper cladding that is made from an optically transparent material having a coefficient of refraction that is lower than a coefficient of refraction of the core and that covers the core in a form of a continuous layer.

17. The light-guide panel for a display with laser backlight according to claim 16, wherein the coefficient of refraction of the upper cladding is lower than the coefficient of refraction of the core.

18. The light-guide panel for a display with laser backlight according to claim 1, further comprising a light-reflecting layer that is located between the substrate and the lower cladding.

19. The light-guide panel for a display with laser backlight according to claim 4, further comprising a light-reflecting layer that is located between the substrate and the lower cladding.

20. The light-guide panel for a display with laser backlight according to claim 6, further comprising a light-reflecting layer that is located between the substrate and the lower cladding.

21. The light-guide panel for a display with laser backlight according to claim 17, further comprising a light-reflecting layer that is located between the substrate and the lower cladding.

* * * * *